United States Patent
Rasmusson et al.

(10) Patent No.: US 8,447,103 B2
(45) Date of Patent: May 21, 2013

(54) METHODS AND ARRANGEMENTS FOR IMAGE PROCESSING

(75) Inventors: Jim Rasmusson, Vellinge (SE); Tomas Akenine-Möller, Lund (SE); Per Wennersten, Arsta (SE); Jakob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/377,106

(22) PCT Filed: Dec. 22, 2009

(86) PCT No.: PCT/SE2009/051483
§ 371 (c)(1),
(2), (4) Date: Dec. 8, 2011

(87) PCT Pub. No.: WO2010/147529
PCT Pub. Date: Dec. 23, 2010

(65) Prior Publication Data
US 2012/0087581 A1     Apr. 12, 2012

Related U.S. Application Data

(60) Provisional application No. 61/187,400, filed on Jun. 16, 2009.

(51) Int. Cl.
*G06K 9/00* (2006.01)
*G06K 9/36* (2006.01)

(52) U.S. Cl.
USPC .......................... 382/166; 382/232; 382/233

(58) Field of Classification Search .................. 382/166, 382/232, 233, 238, 348, 300
See application file for complete search history.

(56) References Cited

U.S. PATENT DOCUMENTS
2006/0088191 A1   4/2006   Zhang et al.
2009/0262880 A1   10/2009  Zhang et al.

FOREIGN PATENT DOCUMENTS
| EP | 0806742 A1 | 11/1997 |
| EP | 1067801 A2 | 1/2001 |
| EP | 1494457 A2 | 1/2005 |
| EP | 1830574 A2 | 9/2007 |
| WO | 2006087479 A2 | 8/2006 |

*Primary Examiner* — Duy M Dang
(74) *Attorney, Agent, or Firm* — Coats & Bennett, P.L.L.C.

(57) ABSTRACT

The present invention relates to methods and arrangements for compressing images. The invention is based on the fact that edge blocks contain much information in one direction (across the edge), but very little information in the other direction (along the edge). By encoding edges explicitly, it is possible to obtain a high quality to a very low cost for many blocks. A block is encoded by first specifying the orientation of the edge in the block, and then specifying the profile across the edge using a function with a small number of parameters.

22 Claims, 20 Drawing Sheets

*Compressed using DXT1*

*Original*

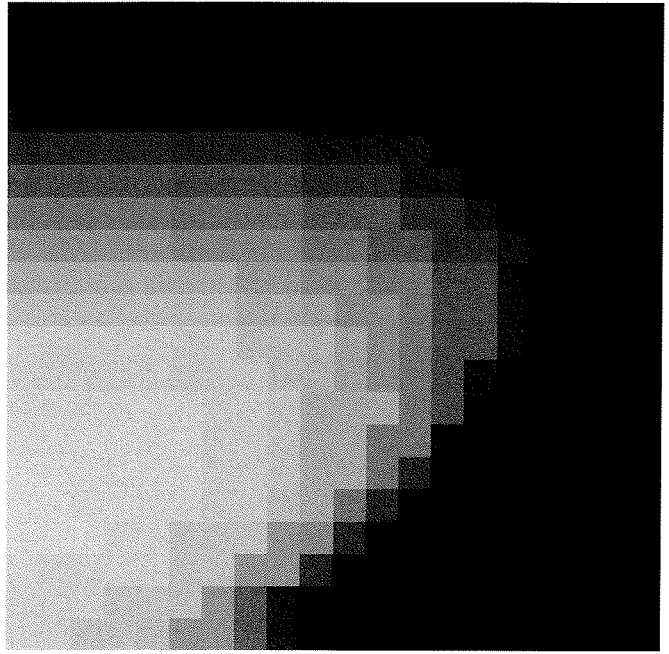
Fig. 4b Compressed with DXT1
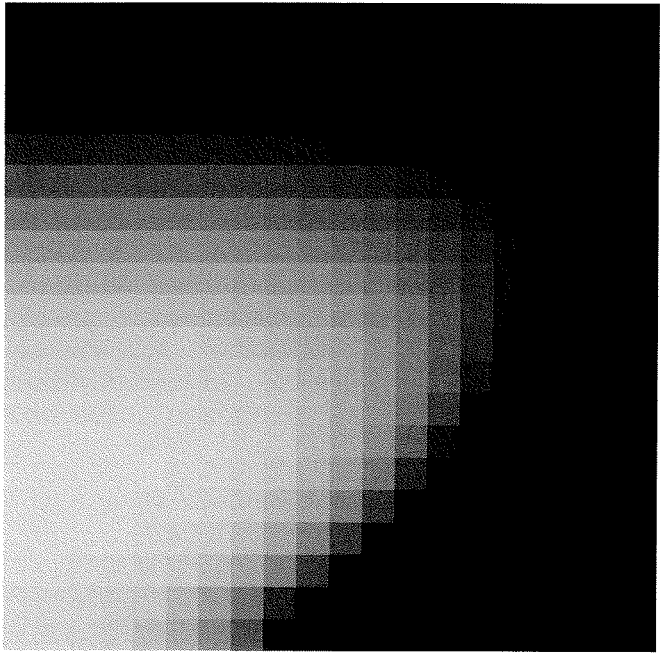
Fig. 4a Original

Compressed

Original

METHODS AND ARRANGEMENTS FOR IMAGE PROCESSING

TECHNICAL FIELD

The present invention relates to encoding and decoding of images, and in particular to image compression and de-compression.

BACKGROUND

Graphics Processing Units (GPUs) are microprocessors associated with graphics rendering. The GPU performs processing on signals from the computer and can write the results e.g. to the display. In contrast to a Central Processing Unit (CPU) which performs overall computations, the GPU typically performs only computations related to graphics rendering, although in recent years general purpose computing has started to be done on GPUs also. FIG. 1 illustrates schematically a mobile device 100 with a GPU 130. Compressed images called textures are stored in an image memory 110 and bits of theses compressed images 150 are transmitted from the texture memory 112 to the GPU 130 and then decoded by a decoder 140 of the GPU 130. The GPU then uses the bits of decompressed textures to produce bits of a rendered image 160. These bits of the rendered image are then sent back to a frame buffer memory 114 and then typically displayed at the display 120. An example could be a rendering of a room with a number of painting hanging on a wall. The textures would then be the pictures in the paintings, and the rendered image would be the final image depicting the room.

When attempting to increase performance for Graphics Processing Units (GPUs), one important method is applying various techniques to reduce memory bandwidth consumption, i.e. the bandwidth required between the memory and the GPU. The importance of bandwidth reduction is also becoming increasingly important as the performance growth rate for processing power is much larger than performance growth for bandwidth and latency for Random Access Memories (RAMs).

Although it is sometimes possible to trade computations for memory accesses (for example by computing the value of functions rather than accessing pre-computed lookup-tables), it is likely that at some point the computation needs are satisfied, leaving the GPU idly waiting for memory access requests. Additionally, a brute force approach of simply duplicating memory banks and increasing the number of pins on memory chips may not be feasible in the long run. Finally, transferring data between the GPU and the RAM consumes large amounts of power, which is a problem, especially in mobile applications. Because of that, memory bandwidth reduction algorithms are an important area of future research.

One type of images used in graphics applications is referred to as textures. A texture is just a regular image that is used to represent the surface of a graphics primitive such as a triangle, or a quadrilateral (quad). In the example above, each painting would be drawn using one quad (or two triangles). Each quad would then be "painted" with a texture depicting the artwork (such as Mona Lisa). In this case, the texture would be an image depicting Mona Lisa. Since a texture is a type of image, it consists of pixels. However, since the final rendered image also consists of pixels, it is common to use the name "texel" for an image element in the texture, and save "pixel" for the image element of the final rendered image. This terminology is assumed in the following. In order to draw a pixel in the rendered image, one must first work out where in the texture this corresponds to. For instance, if the GPU is drawing the middle part of the Mona Lisa painting, the pixel should assume the color from the corresponding texel in the middle part of the Mona Lisa texture. Often however, the pixel will not correspond exactly to a texel in the texture, but will fall somewhere in between four texels. Then, bilinear filtering is usually done between these four texels to produce the pixel. This is referred to in the literature as texture mapping using bilinear filtering. Another complication is that the resolution of the rendered painting may be different from the resolution of the texture. For instance, the painting in the rendered image may occupy 100×100 pixels whereas the texture may have the size of 512×512 texels. Rendering from such a big texture may produce antialiasing artifacts. Therefore, a preprocessing step is typically averaging and subsampling the texture to a set of resolutions, for instance 256×256, 128×128, 64×64, 32×32 16×16, 8×8, 4×4, 2×2 and 1×1 texels. These levels are often called mipmap levels, with the 512×512-version being the highest resolution mipmaps level and the 1×1-version being the lowest resolution mipmap level. The two closest mipmaps levels are then used. If it is again assumed that the painting in the rendered image occupies 100×100 pixels, the GPU will use the mipmap levels of 128×128 texels and 64×64 texels. In each of these, the GPU will calculate the nearest four texels, combine them bilinearly, and then combine the two resulting values linearly. This is referred to in the literature as trilinear mipmapping. As should be clear from the above, this means that up to eight texels may have to be processed in order to produce one rendered pixel.

Texture compression is one popular way of reducing bandwidth requirements. By storing textures in compressed form in memory and transferring blocks of this compressed data over the bus, texture bandwidth is substantially reduced. A light map is a common type of texture. A lightmap is a texture applied to an object to simulate the distance-related attenuation of a local light source. E.g., computer games use lightmaps to simulate effects of local light sources, both stationary and moving.

Traditionally, light maps have been used to model slowly varying lighting behavior in an economical way. A typical example has been a textured brick wall: If only one texture is used, the texture has to be of very high resolution in order to reproduce the details of individual bricks. To avoid big textures an obvious trick is to repeat the brick pattern, which means that the brick texture can be small and still of high resolution with respect to the screen resolution. The drawback is that the brick wall then has to be exactly the same—a brick in the top left part of the wall must be represented by the same texels as a brick in the lower right corner. The lighting will thus be uniform across the entire wall, which often looks unrealistic.

Light maps were created to get around this problem: Two textures were used; one small, repeated texture of high resolution, and one small, non-repeated of lower resolution. The final texel with which to color the rendered pixel can then be calculated using a formula such as $$\text{final\_color}(x,y) = \text{brick\_texture}(x+i*N, y+j*M) * \text{lightmap\_texture\_}(x/S, y/T)$$

where the brick_texture is the repeated texture and lightmap_texture is a low-resolution texture. Here i is changed so that x+i*N is never bigger than N−1 and never smaller than 0 (sometimes by using negatively valued is). Likewise, j is changed so that y+j*M is between 0 and M−1. This way, both brick_texture and lightmap_texture could be small and thus require little bandwidth during rendering. The reason this works is due to the fact that the changes in lighting of the lightmaps usually are rather slow, and lowering the resolution is therefore OK.

Early lightmaps were scalar valued, i.e., they contained only an intensity value in each texel that decreased the intensity of the other texture. Soon came colored lightmaps, where each texel contained an RGB (Red-Green-Blue)-tuple, and so were able to simulate colored light.

Recent developments have increased the photo-realism of light maps by describing the incoming light in three different directions. Hence, instead of just storing a single RGB-tuple in the texel which describes the average (colored) lighting hits a particular point on the texture, three RGB-tuples are stored. Each RGB-tuple now describes the light that shines on a particular point from a particular direction. Together with a normal-map, which describes the normal in the particular point, the fragment shader can then calculate which of these three light directions are most relevant and compute the fragment (pixel) color accordingly. With an additional trick, even texture self-shadowing is possible.

Whereas these recent developments increase photorealism, they also demand three times the storage and bandwidth, since three RGB-tuples are stored instead of one. Moreover, many applications demand high dynamic range data (floats or halfs instead of integers), further increasing the burden of bandwidth and storage. Therefore, light maps are increasingly compressed using texture compression methods, such as DXT1. DXT1 is a texture compression method which converts a 4×4 block of pixels to 64-bits, resulting in a compression ratio of 6:1 with 24-bit RGB input data. DXT1 is a lossy compression algorithm, resulting in image quality degradation, an effect which is minimized by the ability to increase texture resolutions while maintaining the same memory requirements (or even lowering it).

While DXT1-compression usually gives quite good image quality for regular textures, there are a few special cases where DXT1 does not do a very good job. The most important one is perhaps slow transitions between two colors. Since DXT1 cannot have more than four different colors per 4×4 block, it is impossible to create very smooth ramps between colors. The result will be "grainy" or "dirty"-looking transitions. This is exemplified in FIGS. 2a and 2b.

FIG. 2a shows the original texture and FIG. 2b shows the texture compressed with DXT1. Notice how the limitation to only four colors per 4×4 block results in a grainy ramp between gray and white in FIG. 2b.

Unfortunately, since light maps depict smoothly changing light across surfaces, they often contain exactly the type of ramps that DXT1 is bad at handling. At the same time, since the textures are often smooth, the information content in the textures is not that high. Hence it should be possible to do better than DXT1.

ETC2 contains a "planar" mode that approximates each color component in each 4×4 block with a plane equation. This means that smooth ramps are possible within a 4×4 block, if the color variations within the block are roughly planar. As can be seen in FIG. 3, the quality of the ramp is greatly improved compared to DXT1. However, it is far from perfect. For example, note the edge between the ramp and the uniform dark blue area, where a planar approximation is a rather bad approximation.

FIG. 4a shows an original image, and FIG. 4b shows the same image compressed using DXT1. Notice how the image compressed with DXT1 is much more grainy than the original.

SUMMARY

Thus there is a need to achieve improved methods and arrangements for compressing images such as textures.

According to a first aspect of the present invention a method for compressing at least one block of an image is provided. In the method, the image is divided into a plurality of blocks, wherein each block comprises a number of image elements and each image element has a value. A first direction, a second direction and an origin from which the first and second directions originate in the block to be compressed is established, wherein the first direction is orthogonal to the second direction, and the value varies from the first determined value to the second determined value when moving along the first direction. It is then determined a first value and a second value and parameters to a scalar valued function for interpolating between the first and second value are determined. Further, representations of the first and second values, the parameters for the scalar valued function and representations for the first direction, second direction and the origin are stored, which represents the compressed image.

According to a second aspect, a method in a decoder of a Processing Unit for decompressing a block of a compressed image which is divided into a plurality of blocks is provided. Each block comprises a number of image elements and each image element has a value. In the method, the compressed block represented by a set of compressed data is received. Further, representations for a first direction, a second direction and an origin from which the first and second directions originate are received, wherein the first direction is orthogonal to the second direction, and the value varies from the first determined value to the second determined value when moving along the first direction. Moreover, representations of the first and second values and the parameters for the scalar valued function and indications identifying a scalar-valued function for the compressed block are received. The scalar-valued function is used in conjunction with the received representations of the first and second values and the parameters for the scalar valued function and the first and second directions and the origin for de-compressing the block, wherein the scalar-valued function substantially represents a value of the image elements of the block.

According to a third aspect, an encoder for compressing at least one block of an image is provided. The encoder comprises a dividing unit for dividing the image into a plurality of blocks, wherein each block comprises a number of image elements and each image element has a value. The encoder comprises further a processor configured to determine a first value and a second value, configured to establish a first direction, a second direction and an origin from which the first and second directions originate in the block to be compressed, wherein the first direction is orthogonal to the second direction, and the value varies from a first determined value to the second determined value when moving along the first direction. The processor is further configured to determine parameters to a scalar valued function for interpolating between the value of the first value and second value. In addition, the encoder comprises a memory for storing representations of the first and second values and the parameters for the scalar valued function and representations for the first direction, second direction and the origin.

According to a fourth aspect of the present invention a decoder in a Processing Unit for decompressing a block of a compressed image which is divided into a plurality of blocks is provided. Each block comprises a number of image elements and each image element has a value. The decoder comprises an input configured to receive the compressed block represented by a set of compressed data, indications identifying a scalar-valued function for the compressed block, and representations of the first and second colors and the parameters for the scalar valued function and representations for a first direction, a second direction and an origin from which the first and second directions originate, wherein the first direction is orthogonal to the second direction, and the value varies from the first determined value to the second determined value when moving along the first direction. The decoder further comprises a de-compression unit configured to use the scalar-valued function in conjunction with the received representations of the first and second values and the parameters for the scalar valued function and the first and second directions and the origin for de-compressing the block. The scalar-valued function substantially represents accordingly a value associated with the value of the image elements of the block.

An advantage with embodiments of the present invention is that by encoding edges explicitly, it is possible to obtain a high quality to a very low cost for many blocks.

BRIEF DESCRIPTION OF THE DRAWINGS

FIG. 4a shows an original image, and FIG. 4b shows the same image compressed using DXT1.

Figure 10A:
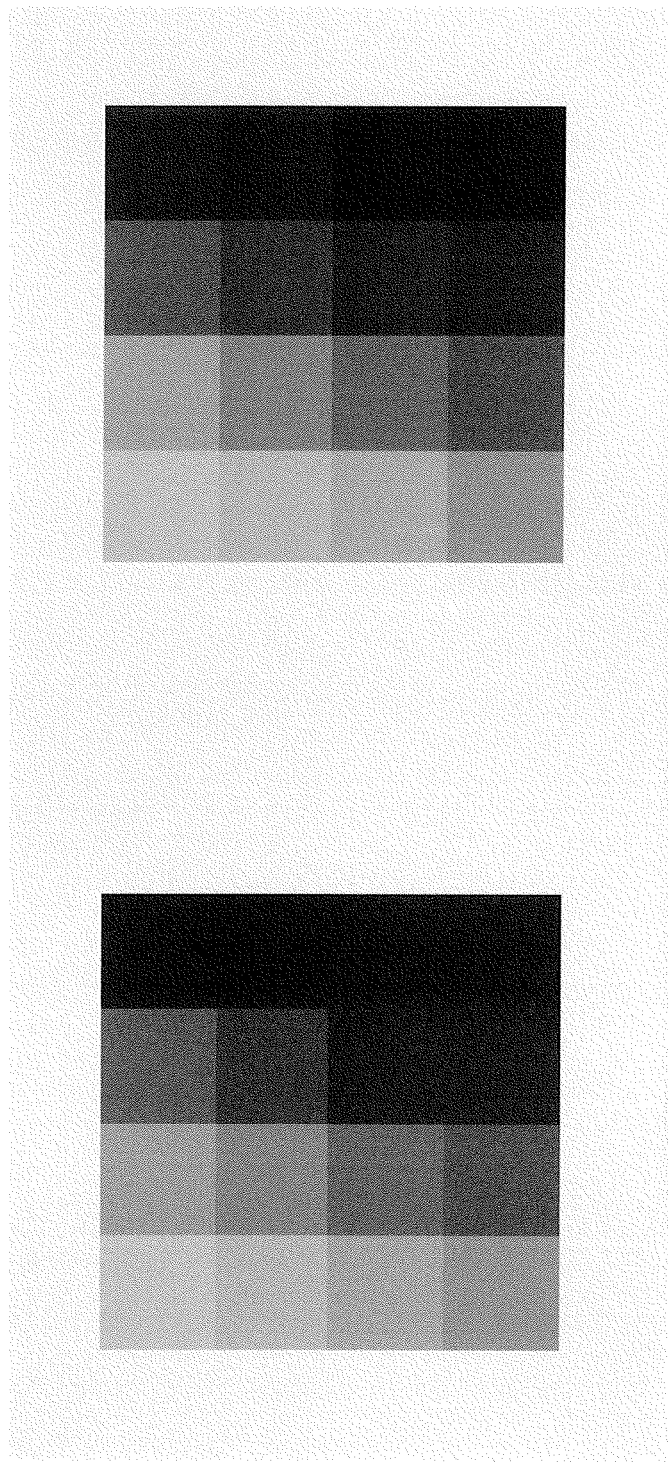

The left image of FIG. 10a is the original image while the right image of FIG. 10a is reproduced by sampling the arctan function with a particular set of parameters.

Figure 10B:
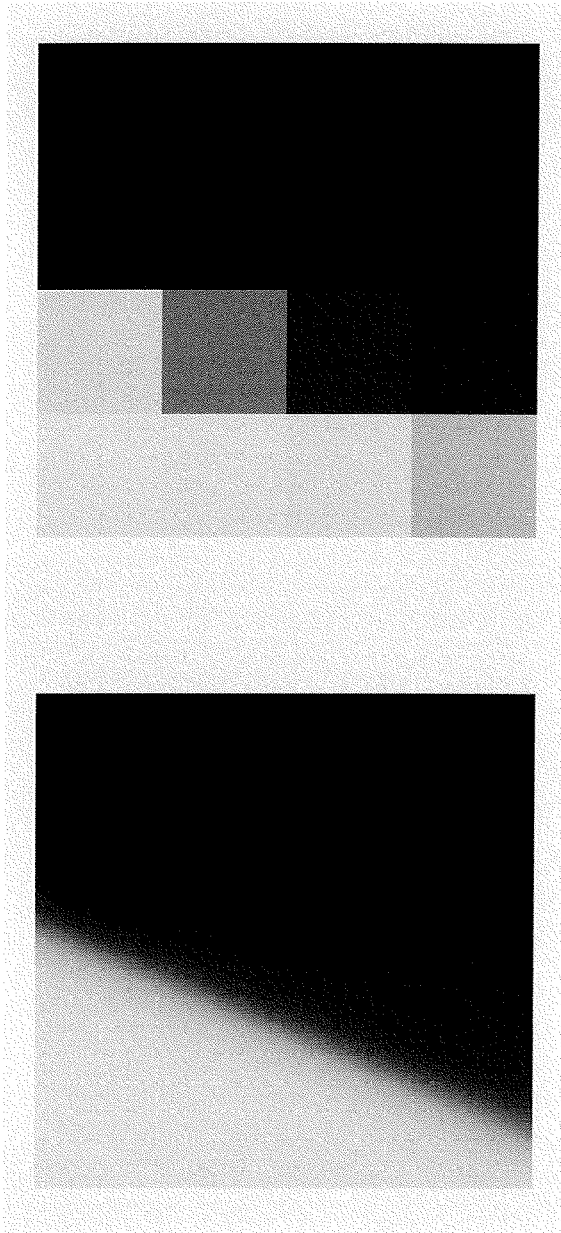

The left figure of FIG. 10b is a block with sharp edge rendered in high resolution and the right figure is a block rendered with typical resolution.

Figure 11:
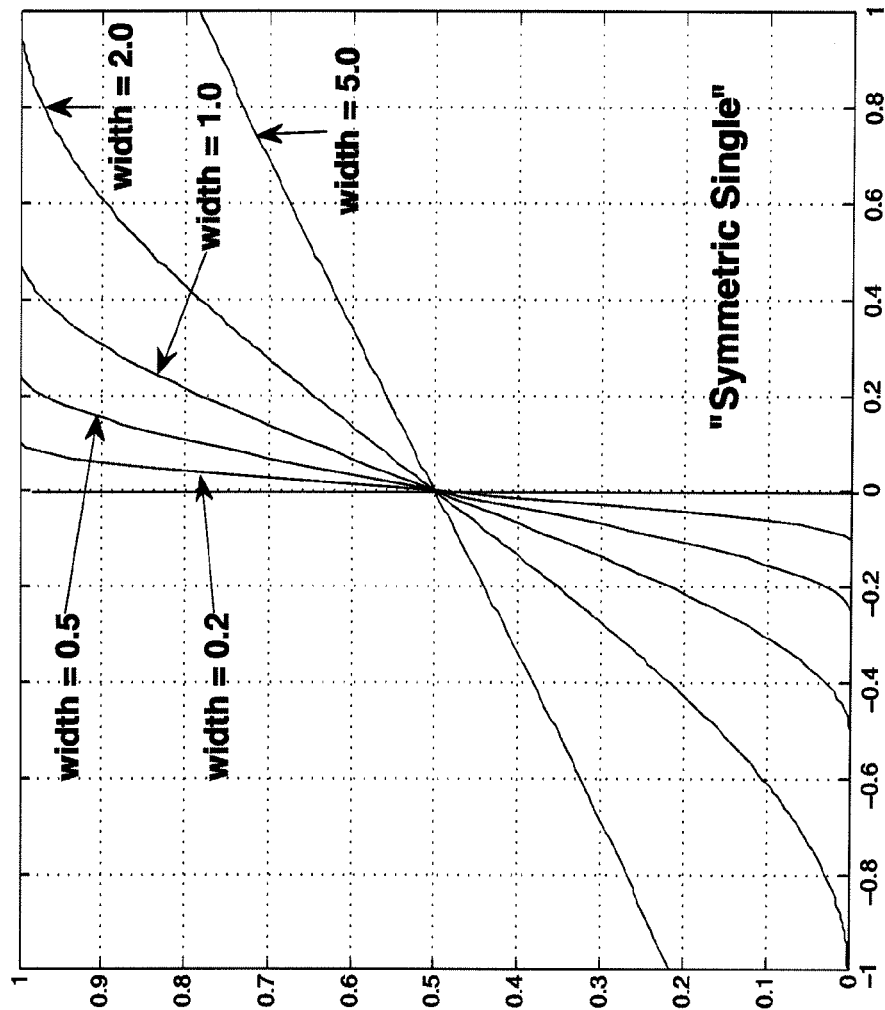
Figure 12:
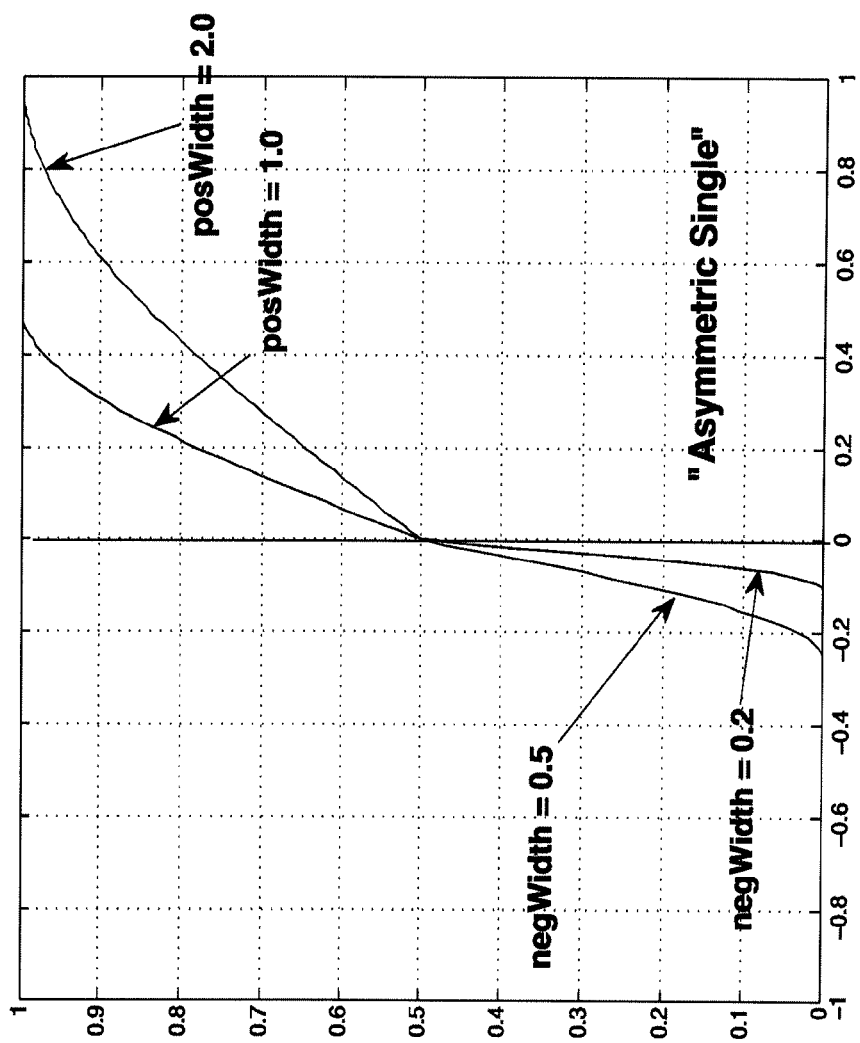
Figure 13:
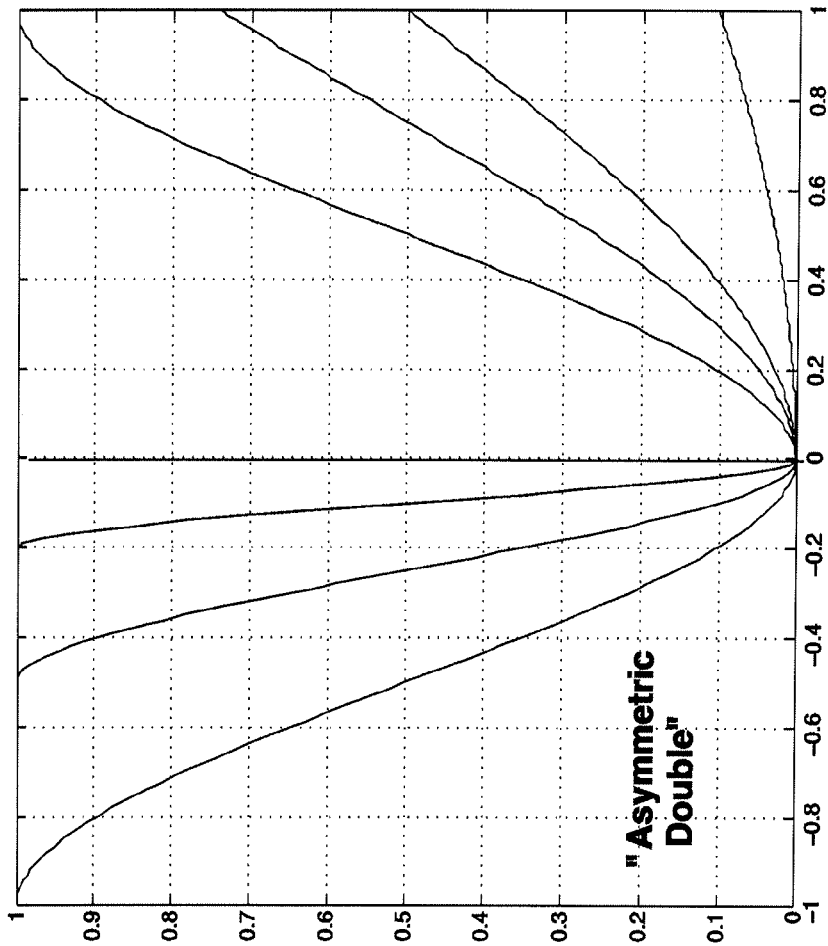

FIGS. 11-13 illustrate scalar-valued functions that can be used for compression according to embodiments of the present invention.

Figure 14:
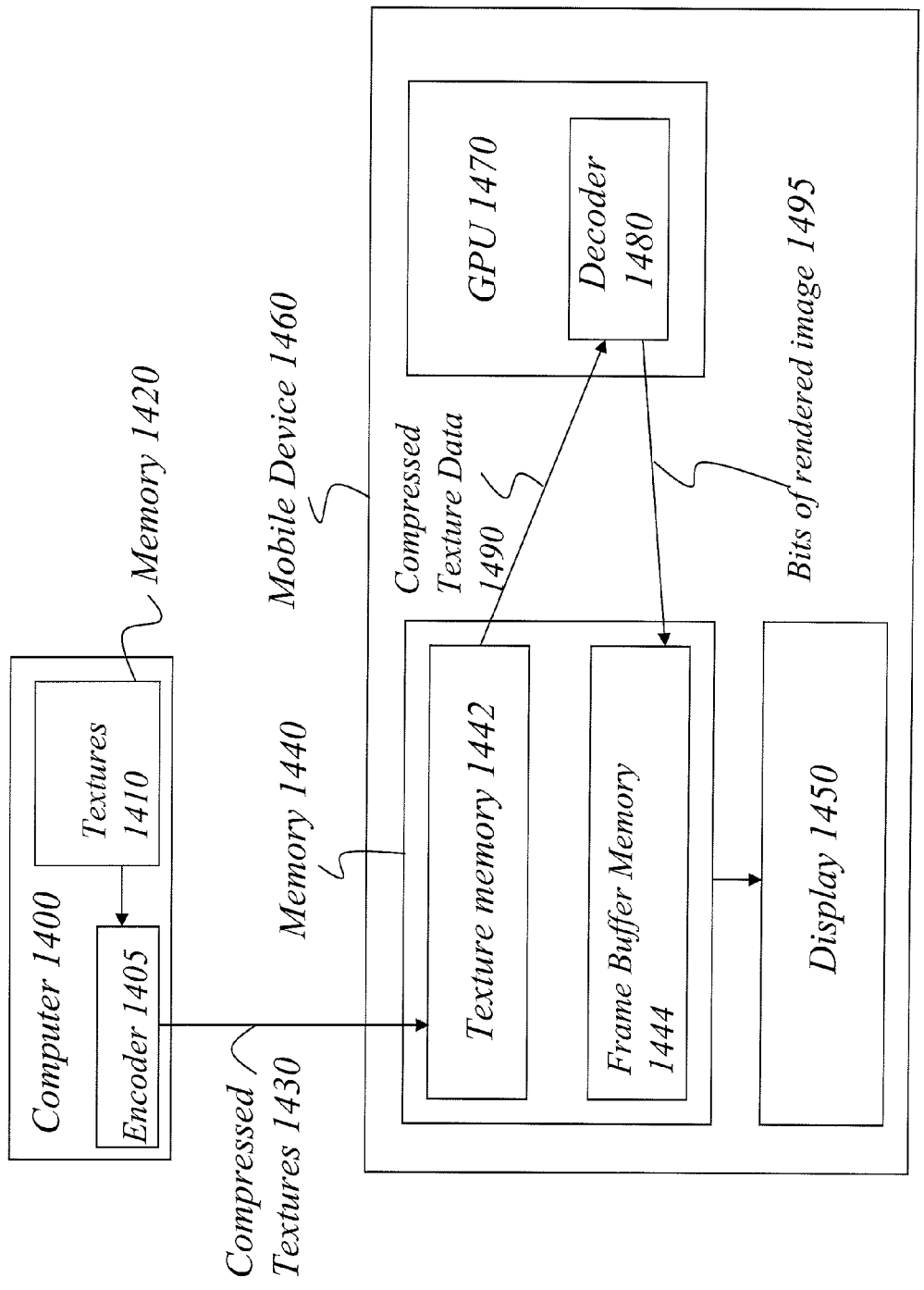

FIG. 14 illustrates an external computer and a mobile device wherein embodiments of the present invention may be implemented.

Figure 15:
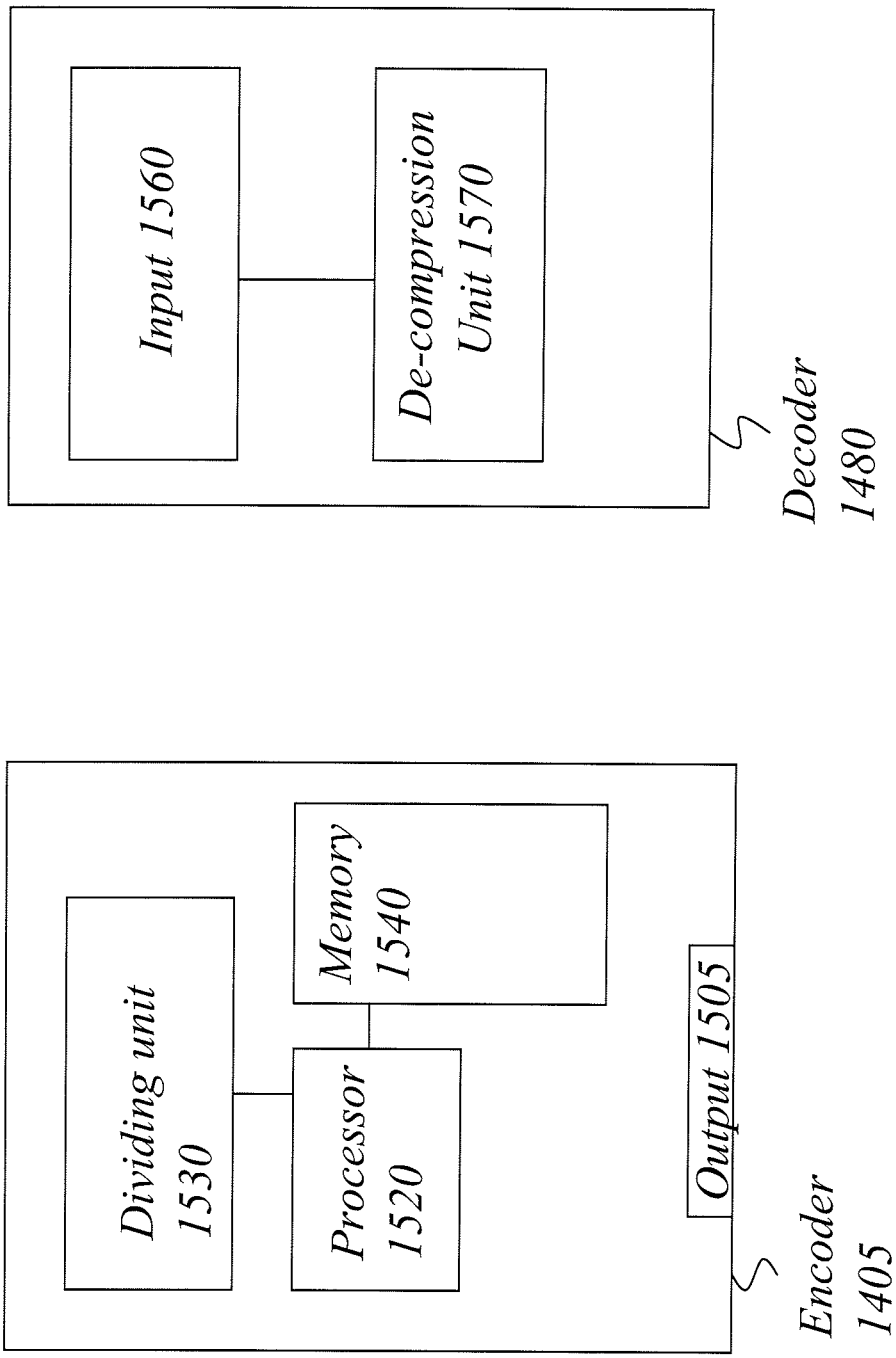

FIG. 15 illustrates the encoder and decoder according to embodiments of the present invention.

Figure 16:
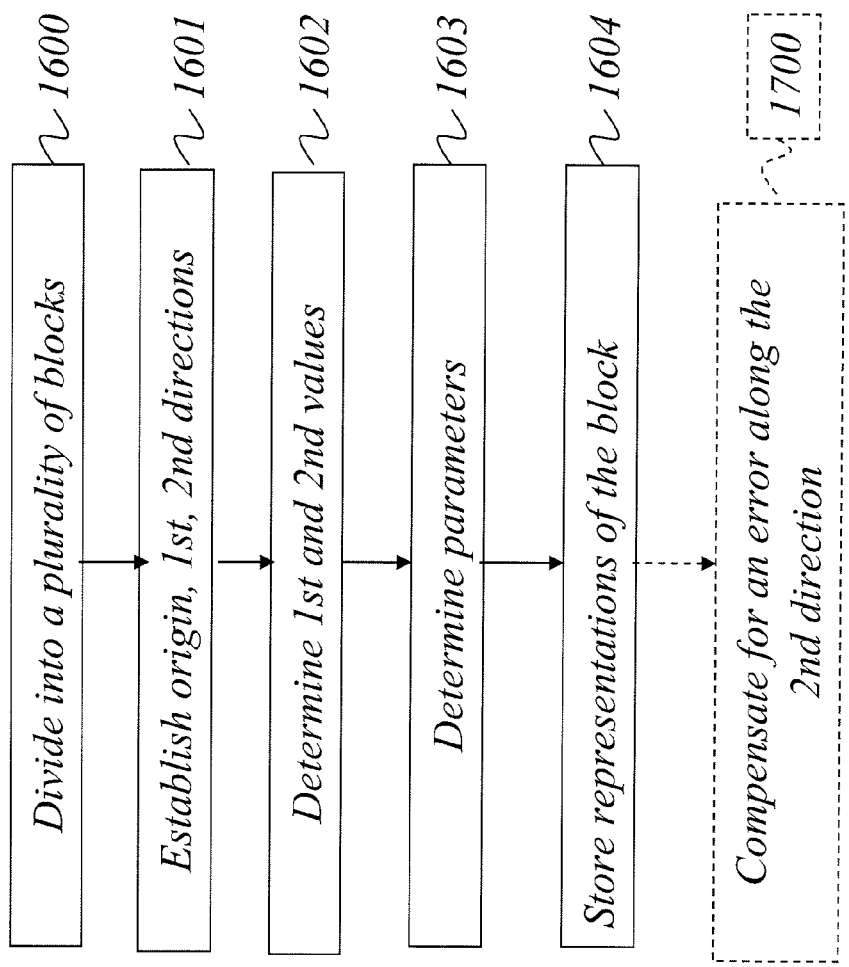
Figure 17:
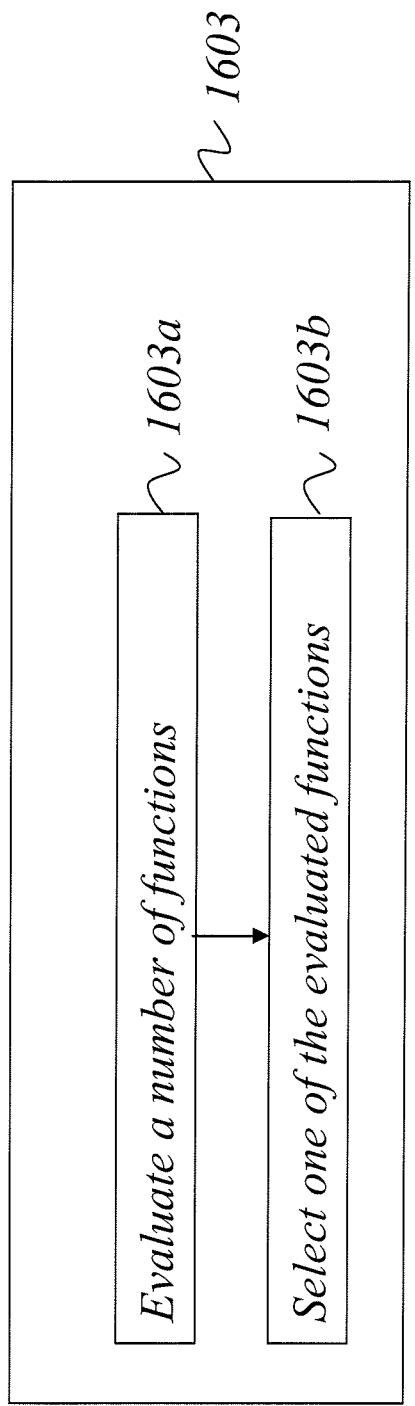
Figure 18:
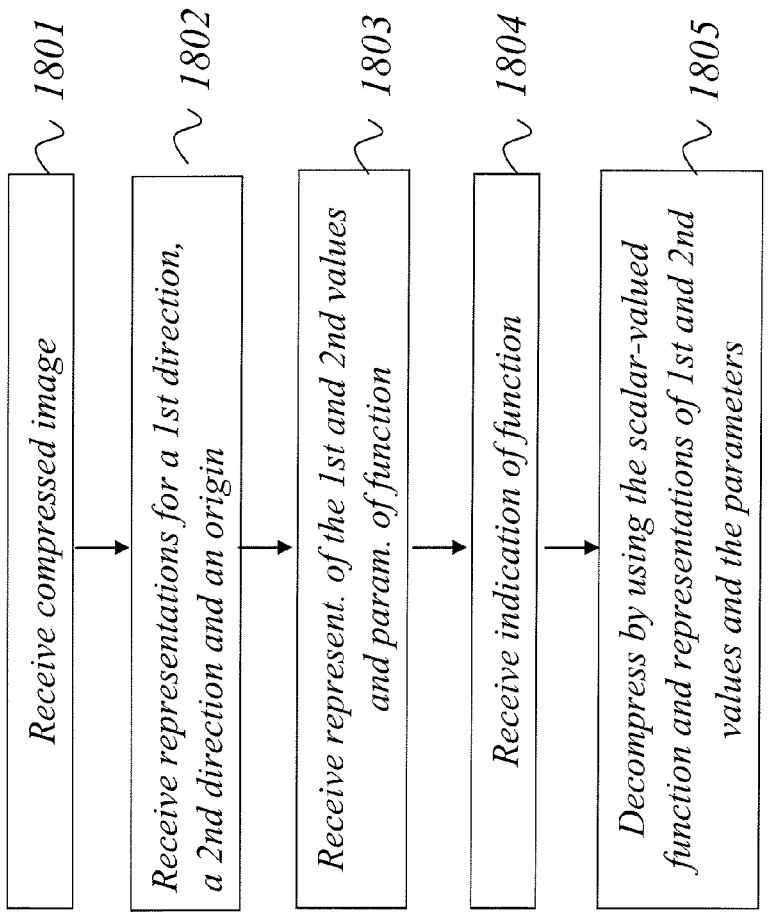

FIGS. 16-18 are flowcharts of methods according to embodiments of the present invention.

Figure 19:
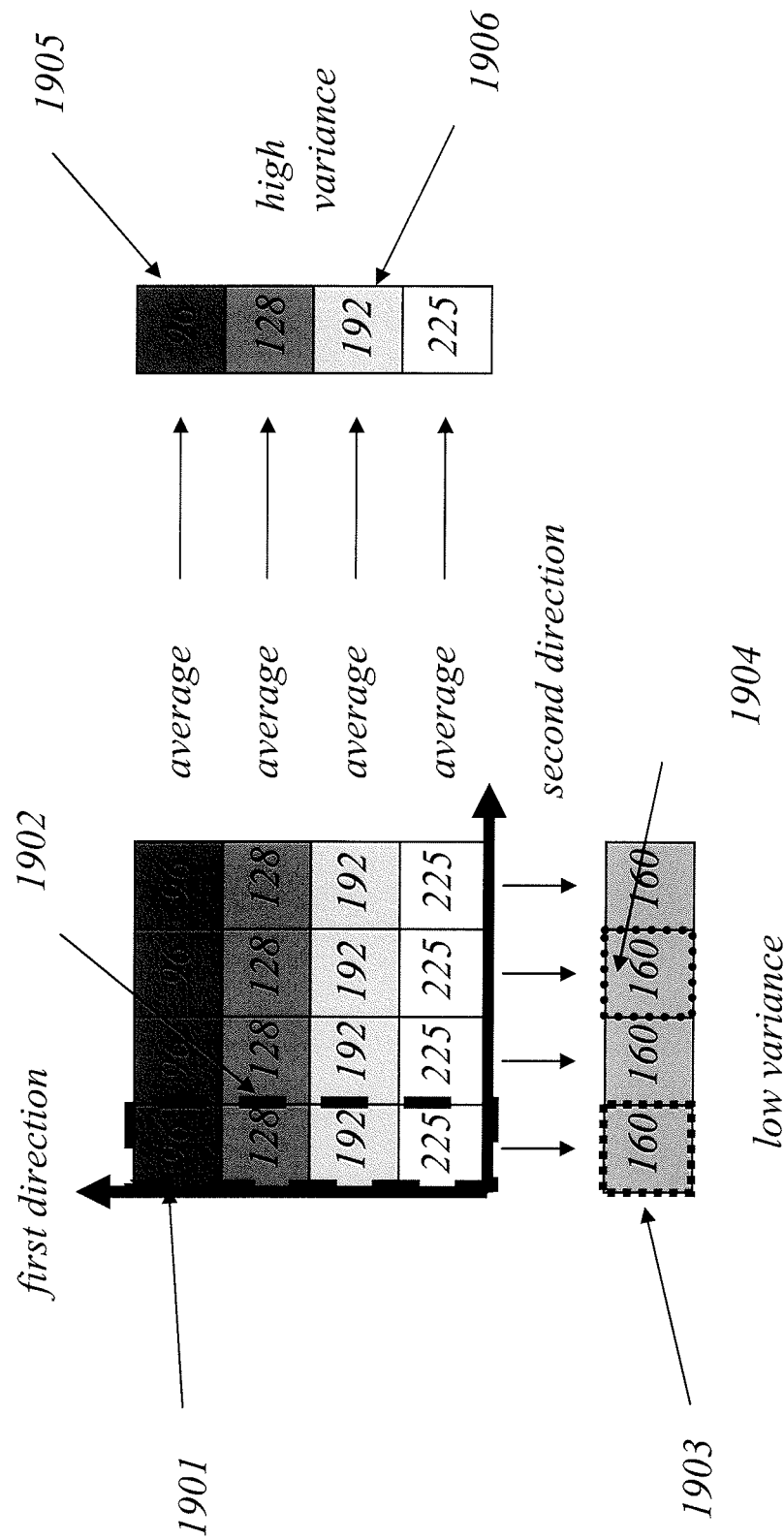

FIG. 19 illustrates the compression according to embodiments of the present invention.

DETAILED DESCRIPTION

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means, units and functions explained herein may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The idea of the planar mode in ETC2 was that blocks that contained very little information, such as planar blocks, could be well handled by a specialized mode.

In the embodiments of the present invention this is taken one step further. Here, it is not only focused on blocks that are well approximated by planar surfaces, but also on an entire set of blocks that contain little information, namely directional blocks.

In short, the idea of embodiments of the present invention is that edge blocks contain much information in one direction, across the edge, but very little information in the other direction, along the edge. By encoding edges explicitly, it is possible to obtain a high quality to a very low cost for many blocks.

Hence, according to one embodiment a block is encoded by dividing the image into a plurality of blocks, wherein each block comprises a number of image elements such as pixels and texels and each image element has a value, e.g., a gray scale value or a color value represented by a trituple of RGB components. Note here that image element values are not necessarily colors. It is also possible that an image element represents a gray value, a normal vector or in principle any kind of information that can be used during rendering and that is amenable to the type of compression described herein. With the advent of general purpose GPU-programming, it is even possible that the information will not be used for rendering, but for general purpose computation. Further, a first and a second value are determined by a processor in the encoder. If the image is a grayscale image the first value may be white and the second value may be black. Then, a first direction, a second direction and an origin from which the first and second direction origin are established by the processor in the block to be compressed. The first direction is orthogonal to the second direction and the value varies from a value indicating the first determined value to a value indicating the second determined value when moving along the first direction. It is suggested that the values of the first and second values are based on an interpolation value between said first value and said second value. To interpolate between the first and second value along the first direction a scalar valued function is used and in a subsequent step parameters of this scalar valued function are determined by the processor such that the scalar valued function represents the interpolation values from the first to the second value as good as possible (or good enough). Representations of the first and second values and the parameters for the scalar valued function are stored in a memory to be used for representing the block. Hence the block is compressed by a compression unit by representing the block with the stored representations of the first and second values, the parameters for the scalar valued function as well as information about the first and second direction and the origin. The stored representations may comprise: information about which scalar valued function that is used, the parameters for the coordinate system (the first and second direction and the origin), the parameters for the function, such as width and the grayscales or colors such as col0=(red0, green0, blue0) and col1=(red1, green1, blue1), and possibly a third color. This is further explained below.

Figure 5B:
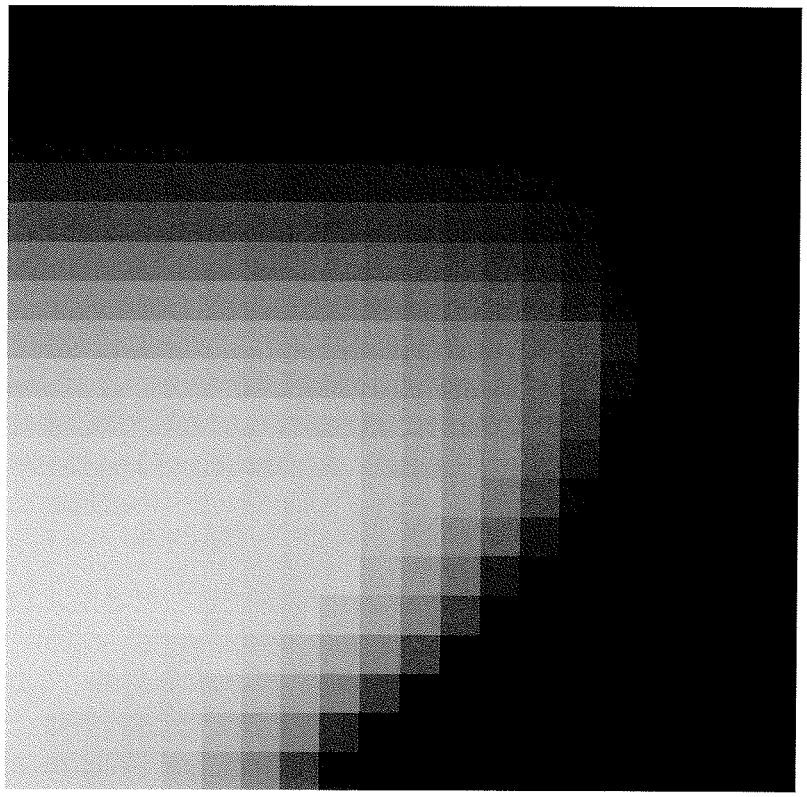
FIGS. 5a and 5b illustrate an example where the texture of FIG. 5a is compressed with ETC2 and the texture of FIG. 5b is compressed with a method of embodiments of the present invention.
Figure 5A:
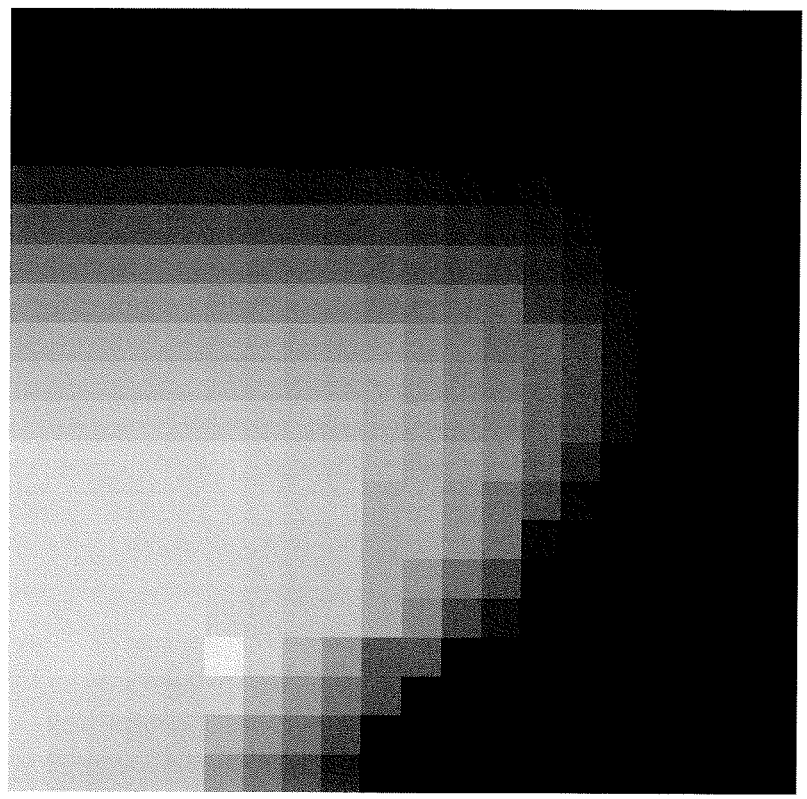

FIGS. 5*a* and 5*b* illustrate an example where the block contains a sharp edge. FIG. 5*a* is the image compressed with ETC2 and FIG. 5*b* is compressed using the present invention.

Note that the method will not only work for blocks with sharp edges; by choosing a sufficiently slowly-changing scalar function, it is possible to represent well also blocks with a smooth blend between two colors in any direction. Another way to put this is that the edge is there but so slow that people would not normally consider it an edge. Moreover, by setting the first and second color to be equal, it is possible to represent a block with a single color. Such a block contains no edges at all.

It will first be described how the embodiments of the present invention can be used to compress gray scale images, and then it will be described how this can be extended to color images. I.e. the image element values are gray scales in the first case and color values in the second case.

First according to one embodiment, each image is divided into 4×4 blocks. Each 4×4 block is then preferably compressed to a fixed number of bits, for instance 64. However, it is also possible to have a variable number of bits per block.

The next step is then to establish two orthogonal directions in the block, and an origin. The directions are arranged so that the gray scale, i.e. value of the color or the value of the pixel intensity in the case of gray scale images, varies more along the first direction, than along the second direction. The origin is supposed to be placed "on the edge" in the block.

Figure 6:
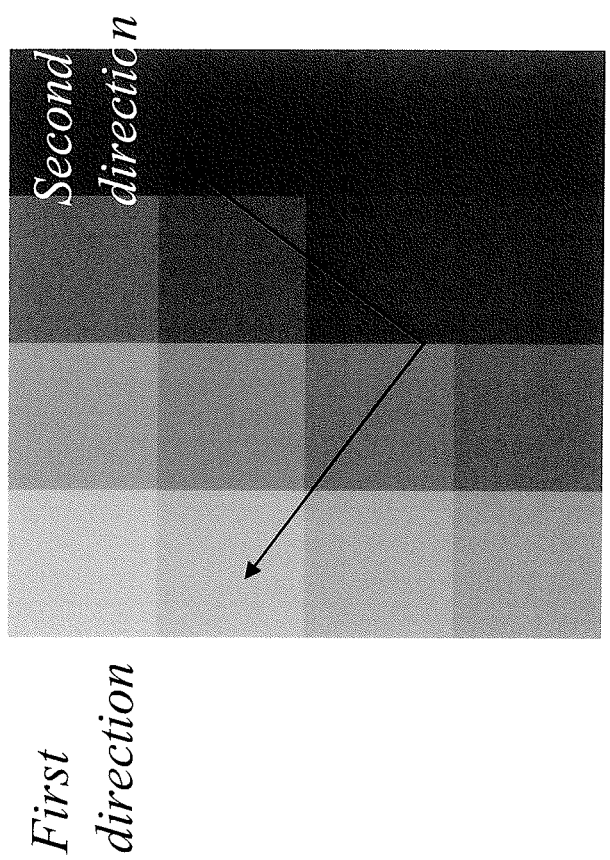
FIG. 6 exemplifies how the first and second direction can be placed according to embodiments of the present invention.

An example how the coordinate system of the first and second directions could be placed is shown in FIG. 6. Here, the first direction is placed so that it is "across" the edge, the second direction is placed so that it is "along" the edge, and finally the origin is placed so that the second direction is "on top" of the edge. Note how the pixel intensity values (i.e. color values) vary more along the first direction, and hardly at all along the second direction.

Mathematically, this can be done by fitting a line $Ax+By+C=0$ to the second direction, where the x-axis is along the lower edge of the block and the y-axis is along the left edge of the block. By normalizing the equation so that $A^2+B^2=1$, it is possible to get the benefit of easily being able to calculate the distance d from any point $(p_x, p_y)$ to the line by simply putting it into the line equation; $d=d(p_x, p_y)=Ap_x+Bp_y+C$. This distance is signed so that it is negative on one side of the line and positive on the other.

Accordingly, the basic idea of the present invention is to use a scalar-valued function f(t) to represent the block, or as explained below, to represent an interpolation parameter between the first and second color values. Hence this function f(t) will represent values associated with the color of the block and in the case when there is an edge in block to be represented, the function f(t) would have a constant or close to constant value for all points along the second direction, but different values along the first direction. This will be explained by first letting f(t) be a function representing the color value wherein f(t) is a function of the distance to the line $Ax+By+C=0$, which can be calculated using d:

color value=$f(d)=f(Ax+By+C)$.

To calculate the color value for a particular point $(p_x, p_y)$ in the block, the function $g(p_x,p_y)=f(d(p_x,p_y))=f(Ap_x+Bp_y+C)$ is used.

For the function f(t), basically any scalar-valued function could be used. In the case when an edge for black to white is to be represented, the color value should be close to zero away from the edge, and then make a continuous transition from small to high near the edge, and land at a high value on the other side. A function that could be used as the edge function f(t) is arctan(t), as shown in FIG. 6. Thus, it is necessary to determine the parameters of this scalar valued function such that the function f(t) represents the block in an acceptable way. The parameter controlling the width of the transition between the first color (e.g. white) and the second color (e.g. black) is one of the parameters to be determined. That is further explained below.

Arctan makes most of the transition between black (here represented as −1.5, or −pi/2) and white (pi/2) in about 10 pixels. If a wider or narrower transition is desired the parameter t has to be divided by a constant, width:

$f(t)$=arctan($t$/width).

Since different blocks will need differently quick transitions, the width parameter may actually be selected per block and stored in the compressed version of the block.

Figure 8:
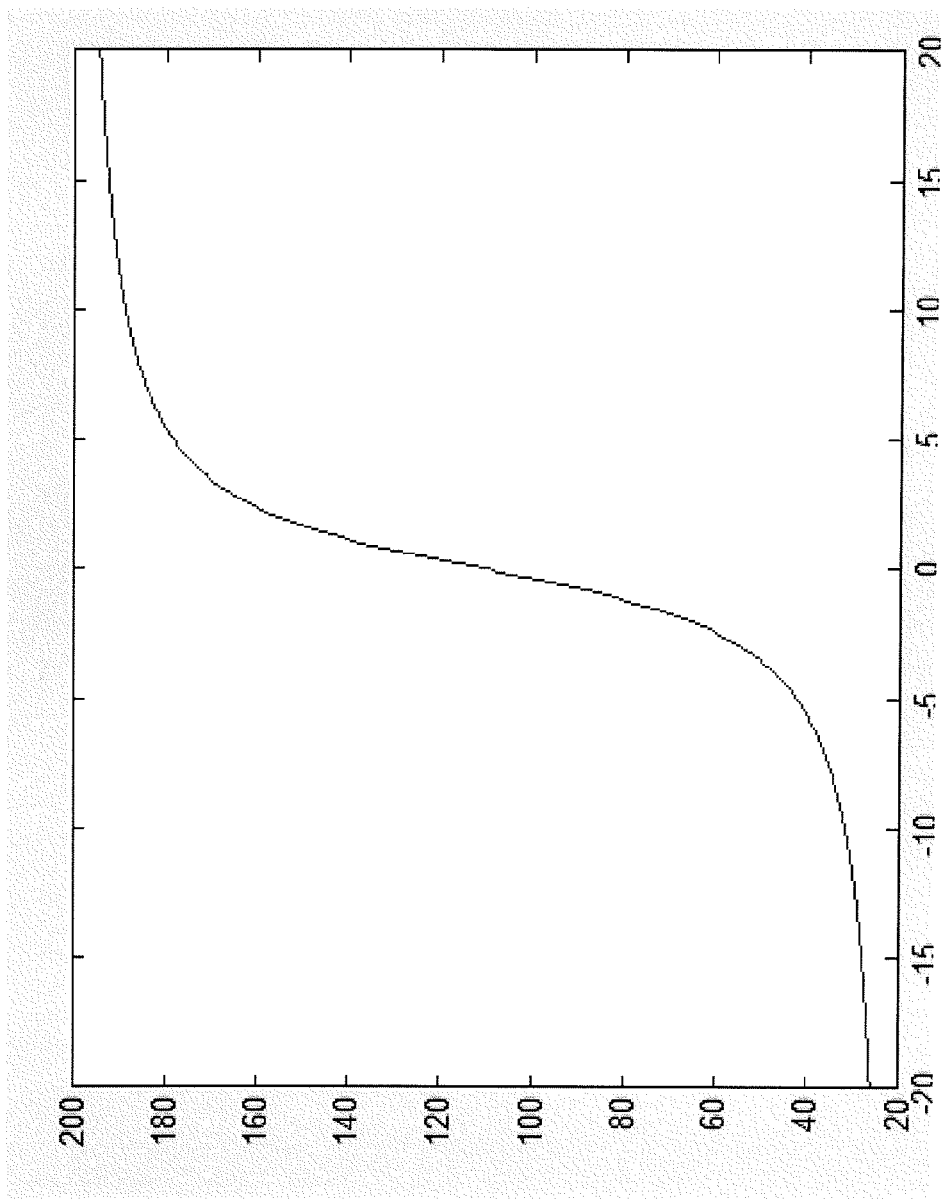
FIG. 8 illustrates the function arctan used as an interpolation parameter between 20 and 200.

Another caveat is that the gray value in most blocks do not go from completely black to completely white. Also, black is typically represented by 0 (and white by 255). To address these two problems, it is suggested that the color value from the scalar valued function should not be directly used as the gray value, but instead be used as an interpolation parameter between two gray values (i.e. between the first and second colors). Hence the color values of the first and second colors are based on an interpolation value between said first color and said second color. To get this interpolation value between 0 and 1, pi/2 will be added and divided by pi. Thus the color value of a particular pixel is in the case of grayscale images obtained by:

$d=d(p_x,p_y)=Ap_x+Bp_y+C$ interpolation_value=$f(d)$=(arctan($d$/width)+pi/2)/pi gray_value=gray0*(1−interpolation_value)+ gray1*interpolation_value For instance, using gray0=20, gray1=200, and width=2 gives gray values shown in FIG. 8.

Figure 9:
FIG. 9 illustrates a continuous image, which is a result of the method according to an embodiment of the present invention.

Using the values gray0=194, gray1=61, A=1.205, B=0.506, C=−0.65 and width=0.2497 will generate the image in FIG. 9.

Sampling this image in the 16 pixels of a 4×4 block will produce the image to the right in FIG. 10*a*, which is very close to the original to the left.

As an example, by lowering the width value, it is possible to get a much sharper edge in the block, as is shown in the left figure of FIG. 10*b*, where gray0=194, gray1=61, A=1.205, B=0.506, C=−0.65 (i.e., the same as before but width=0.0313). The right figure of FIG. 10*b* shows the same block but with resolution 4×4.

It is of course possible to use other functions than arctan. In an alternate embodiment of the invention, the following function as shown in FIG. 11 can replace the arctan function, which is called the "symmetric single" asymmetric function.

```
s = d/width + 0.5;
    if (s<0), s = 0;
    if(s > 1), s = 1;
interpolation_value = 3s² – 2s³
``` for values of d between −0.5 and 0.5. For values of d smaller than −0.5, the interpolation value should be equal to 0, and for values bigger than 0.5, the interpolation value should be 1. It is plotted above using a few different width values. Note that this function only has a single width parameter and thus has the same "smooth curve" on either side of d=0 (on either side of the line Ax+By+C=0). However, there are cases when the input data is transitioning at different speeds on either side of d=0 and for these cases the "asymmetric single" asymmetric function can be used as illustrated in FIG. 12, where there are different widths depending of the sign of d:

```
if (d>0), s = d/width_pos, else s = d/width_neg;
    if (s<0), s = 0;
    if(s > 1), s = 1;
interpolation_value =   z = 3s*s – 2*s*s*s
```

However, some blocks contain not only an edge that goes from dark to bright, but perhaps an edge that goes from dark to bright and back to dark again. For such blocks, it may be better to use a function such as shown in FIG. 13, which is called the "asymmetric double" function. This function can have a single width parameter or two width parameters. It should be noted that the function below has two width parameters and is thus "asymmetric"):

```
if (d>0), s = d/width_pos, else s = d/width_neg;
    s = abs(s);
    if (s<0), s = 0;
    if(s > 1), s = 1;
interpolation_value =   z = 3s*s – 2*s*s*s
```

This function as shown in FIG. 13 provides an interpolation value that goes from 1 (for d=−width_neg), to zero (for d=0), and then back to 1 again (for d=width_pos). For this function it is possible to have three gray values, gray0, grayNeg and grayPos.

For negative d-values Gray_value=gray0*(1−interpolation_value)+grayNeg*interpolation_value can be used;

For positive d-values Gray_value=gray0*(1−interpolation_value)+grayPos*interpolation_value can be used.

In the previous example the variable s was clamped to the interval [0, 1] by setting it to zero if s<0 and setting it to 1.0 if s>1.0. Alternative ways of clamping may also be used, for example the below clamping to [0, 1.5], which gives a function that is called "asymmetric_double_hook".

```
if (d>0), s = d/width_pos, else s = d/width_neg;
    s = abs(s);
    if (s<0), s = 0;
    if(s > 1.5), s = 1.5;
interpolation_value =   z = 3s*s – 2*s*s*s
```

This gives a function that goes from 1, to 0, to 1 and then goes down again. It may be possible to have other smooth functions as well of course.

Extending this to color can be made by simply changing the last interpolation step. For the arctan or asymmetric-single, it is possible to replace gray_value=gray0*(1−interpolation_value)+
    gray1*interpolation_value by red_value=red0*(1−interpolation_value)+
    red1*interpolation_value green_value=green0*(1−interpolation_value)+
    green1*interpolation_value blue_value=blue0*(1−interpolation_value)+
    blue1*interpolation_value Thus the first color is red0 and the second color is red1 in the first case and the first color is green0 and the second color is green1 in the second case and the first color is blue0 and the second color is blue1 in the third case. Also note that the interpolation value is the same for all three color components.

In the above examples the value has been either a gray value or a color. In both these cases it makes sense to interpolate linearly. In some cases it may not be a good idea to do linear interpolation. For example, if it is dealt with normals of length 1, there may be a first normal vector $a=(a_x, a_y, a_z)$, and a second normal vector $b=(b_x, b_y, b_z)$. Since these are normalized so that $a_x^2+a_y^2+a_z^2=1$, it is not necessary to store all three components, since for instance $a_z$ can be calculated from $a_z$ and $a_y$. Hence the interpolated normal vector $n=(n_x, n_y, n_z)$ can be calculated as $n_x=a_x*(1-\text{interpolation\_value})+$
    $b_x*\text{interpolation\_value}$ $n_y=a_y*(1-\text{interpolation\_value})+$
    $b_y*\text{interpolation\_value}$ $n_z=sqrt(1-n_x^2-n_y^2)$ instead of performing linear interpolation in all three components.

A person skilled in the art will know that even the above interpolation between vectors a and b is not ideal—it will not have a constant angular velocity with respect to the interpolation value. Therefore an alternative interpolation method can be to do the following:

First the angle θ between the vectors a and b is found by $\theta=\arccos(a \cdot b/(|a||b|))$, Where a·b is the inner product between the vectors a and b. It is now desired to find the normal m to a plane that holds both a and b, and this can be done by the cross product:

$m=a \times b$, where x here denotes the cross product. A coordinate system in this plane is desired where a is the first basis vector in the coordinate system. The second should be orthogonal to both a and m, and can therefore be obtained by $c=m \times a$, where again x denotes the dot product. The coordinate system should be orthonormal, and a already has unit length, so it is only needed to normalize c using $c'=c/|c|$, where $|c|=sqrt(c_x^2+c_y^2+c_z^2)$ is the length of c.

In this new coordinate system it is possible to write the vector b as a linear combination of a and c':

$b=\cos(\theta)a+\sin(\theta)c'$.

This is due to the fact that b lies in the same plane as a and c', that θ is the angle between a and b and because b has unit length. The interpolated vector n can be calculated by using $$n = \cos(\text{interpolation\_value}*\theta)a + \sin(\text{interpolated\_value}*\theta)c',$$

in the case where the interpolation value goes between 0 and 1. In more detail;

$$n_x = \cos(\text{interpolation\_value}*\theta)a_x + \sin(\text{interpolated\_value}*\theta)c'_x,$$

$$n_y = \cos(\text{interpolation\_value}*\theta)a_y + \sin(\text{interpolated\_value}*\theta)c'_y,$$

$$n_z = \cos(\text{interpolation\_value}*\theta)a_z + \sin(\text{interpolated\_value}*\theta)c'_z.$$

The main reason for mentioning these two ways of interpolating normals is to point out that the interpolation in the present invention can be done in a number of ways depending upon what kind of data is stored in the value and how it will be used.

It is also possible to use different interpolations values for the three color components, but that means that values for A, B, C and width must be stored several times, once for each color. This would either increase the number of bits stored per block, or it would mean that stronger quantization of these parameters would be necessary. Therefore it may be preferable to use the same interpolation parameter for all three color component.

When using the asymmetric double function, interpolation happens between three different colors, such as redNeg, red0 and redPos in the same way as previously shown with grayNeg, gray0 and grayPos.

Accordingly, in conjunction with the present invention it is desired to represent smooth transitional regions of input data in a compact form. Functions as described above together with parameters such as width, orientation and position of a line, two or more base-colors etc have been used to describe these input blocks of color data. Another approach that is effective for some input blocks is to store the colors of the four corner pixels (upper left (UL), upper right (UR), lower left (LL) and lower right (LR)) of the 4×4 pixel block in some compact way and then create the other pixels in the block by bilinear interpolation.

The pixel at position x,y in the 4×4 grid is then interpolated from the four corner pixels (UL, UR, LL and LR) as:

$$v = (y+0.5)/4;$$

$$u = (x+0.5)/4;$$

$$\text{red\_level} = (1-u)*(1-v)*UL\_\text{red} + u*(1-v)*UR\_\text{red} + (1-u)*v*LL\_\text{red} + u*v*LR\_\text{red};$$

green and blue values correspondingly.

The four corner pixels can be represented and stored in different ways:

For example all four corner colors are stored independently but with relatively few bits per corner and component (due to a limited bit budget).

In another example, two base colors (not corner colors) are stored with relatively high precision and the four corner colors are linearly interpolated from these two base colors. An index per corner is stored.

In a further example, three of the four corner colors are stored independently and the fourth corner color is linearly interpolated from the closest two corners. An index is stored for this fourth corner.

In a yet further example, two of the corner colors are stored. The other two corner colors are represented as a luminance offset from either of the two stored corners. For each these two "luminance offset corners", a single luminance offset value is stored.

To summarize, as illustrated in the flowchart of FIG. 16, an image is compressed by:

1600. A dividing unit divides the image into a plurality of blocks, wherein each block comprises a number of pixels wherein each pixel has a value.

1601. A processor establishes a first direction, a second direction and an origin from which the first and second direction originate in the block to be compressed. The first direction is orthogonal to the second direction and the value varies from a first determined value to a second determined value when moving along the first direction.

1602. The processor determines a first and a second value.

1603. The processor determines parameters to a scalar valued function for interpolating between the first value and the second value.

1604. A memory stores representations of the first and second values and the parameters for the scalar valued function, as well as the representation for the first and second direction and origin.

It should be noted that the steps 1601, 1602 and 1603 may be performed in any arbitrary order. An example of how the compression can be carried out will now be given. The image is first divided into 4×4 blocks according to step 1600. The first and second direction is then established as illustrated in step 1601. It is known that the value of the block should not vary much along the second direction, whereas it is allowed to vary along the first direction. FIG. 19 shows a simplified example, where the first and second directions are aligned with the block coordinate system. If the average gray level is calculated along the first dimension 1901, by averaging the values 96, 128, 192 and 225 in the first column 1902, this would result in a value 1903 that is similar to the average 1904 of another column. This is also the case as can be seen in FIG. 19, since all the columns arrive at the same value 160. The variance between the averaged columns should be low (in this case zero). By doing the same thing for the rows, it can be seen that they vary much more; for instance the first row is averaged to the value 96 1905 whereas the third row is averaged to the value 192 1906. This is because the block changes much along the first direction; it hence depends a great deal where on the first dimension the averaging is performed, i.e., which row which is averaged. Hence the variance of the averaged rows should be high. By using the MATLAB command var( ) it can be seen that the variance for the rows is var([96 128 192 225])=3456.26 is indeed high, whereas the variance for the columns var([160 160 160 160])=0 is zero.

The strategy to find the first and second direction is that the variance when averaging along the first direction should be minimal, and when averaging along the second direction the variance should be maximal. This is illustrated by the example in FIG. 7.

Figure 7:
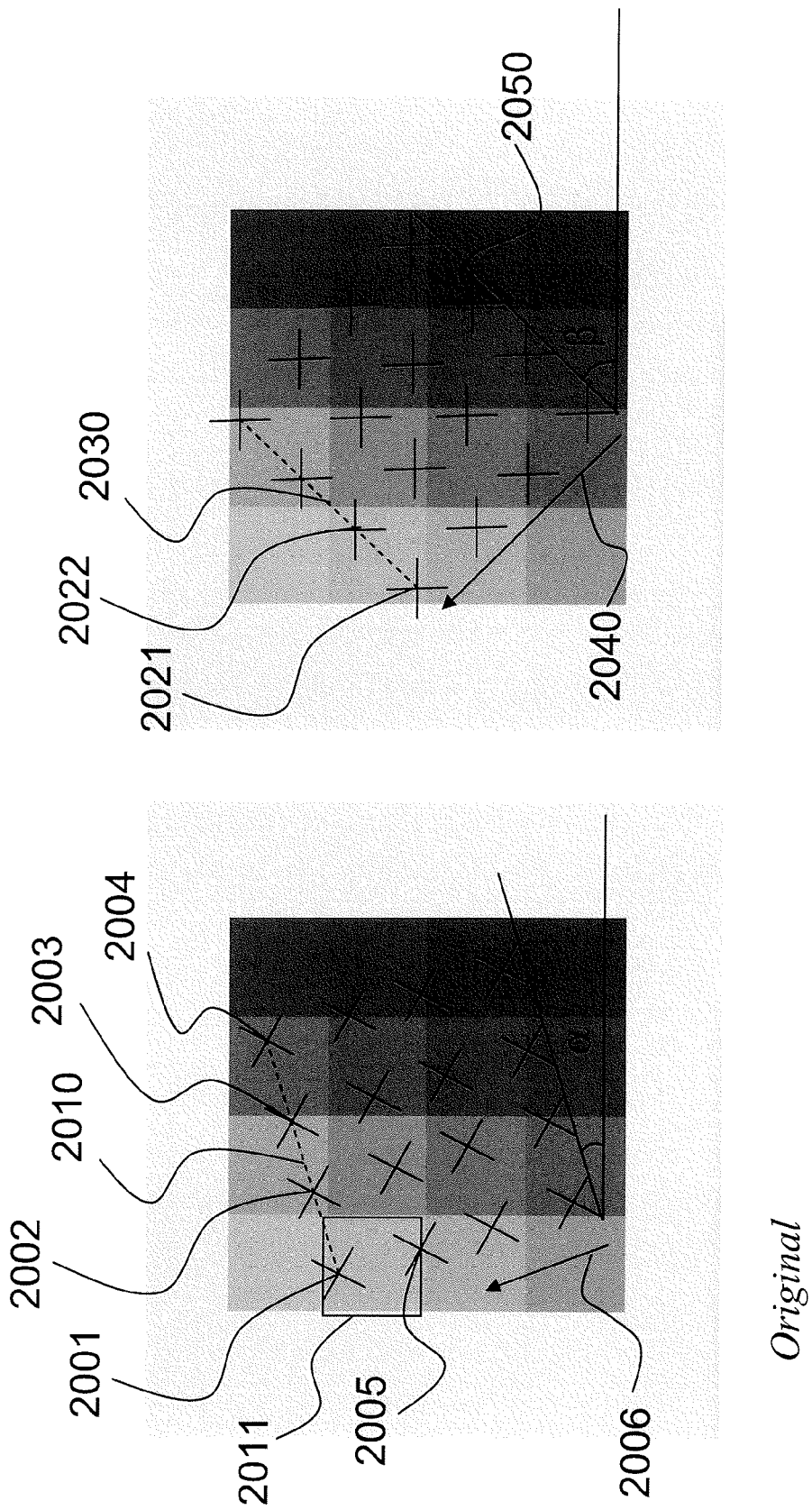
FIG. 7 illustrates how to find the first and second directions according to embodiments of the present invention.

In the left diagram in FIG. 7 the gray level of the original block is sampled in 16 points. These points are centered around the center of the block and rotated α degrees. Sampling implies finding the gray level for the positions of the points. For instance, point 2001 lands in pixel 2011, which has gray value 159. Hence the value sampled in point 2001 is 159. For persons skilled in the art of sampling, this is referred to as "nearest neighbor sampling", and there are also other ways of sampling, such as bilinear sampling. In this example, the nearest neighbor sampling will be used. For each row, the four samples of the row will be averaged together. As an example, for row 2010, the four samples denoted 2001, 2002, 2003, and 2004 will be averaged. Assume that the sampled value for 2001 is 159, 2002 and 2003 are both 144 and 2004 is 107, then the value for the row is (159+144+144+107)/4=138.5. If this is done for all four rows:
Row1=138.5, row2=116.25, row3=107.5, row4=90.25.

Doing the same for the columns gives:
Column1=141.75, column2=121, column3=102.5, column4=87.25.

The variance of the row values is now calculated, for instance by using the var( ) function of MATLAB: var([138.5 116.25 107.5 90.25])=402.8542. Doing the same for the columns results in 554.6042. It can be noted that the averaged columns have a higher variances than the rows, which means that the column direction 2006 will be a bad candidate for the first direction.

In the right diagram in FIG. 7 the sampling pattern is rotated $\beta$ degrees. If the sample values are averaged for rows and columns in this case:
Row1(2030)=151.5, row2=128, row3=97.5, row4=81.5.
Column1=122.75, column2=120.5, column3=111.5, column4=103.75

It can be noted that the row variance var([151.5 128 97.5 81.5])=976.3958 is much higher than the column variance var([122.75 120.5 111.5 103.75])=76.1875. Hence the column direction 2040 will be a very good candidate for the first direction.

This direction vector can be calculated as $(-\sin(\beta), \cos(\beta))$, and the second direction can then be calculated as $(\cos(\beta), \sin(\beta))$.

In reality we may not just try two random angles $\alpha$ and $\beta$, but instead all angles between 0 and pi/2 are investigated, for instance in 100 steps. The angle for which the row variance is maximal is selected, and the first and second direction are calculated by using the formulae above. An alternative embodiment may instead minimize the column variance, or minimize the quotient between the column and row variances. The initial position for the origin can be selected to be the middle of the block.

Once the first and second direction have been obtained, the first and second colors are determined 1602. One possibility is to sample the gray level from the original block at the top row, for instance using the gray level sampled in 2022 as the first color. For the second color, it is possible to sample somewhere on the bottom row, for instance in 2050.

The parameters of the function (step 1603) are now specified. If the arctan(x/width) function is used, the only parameter to specify is the width. This can be done by trying all widths, from the smallest to the largest. Keeping the first direction, second direction, origin, first color and second color fixed, and varying width, it is possible to see which width gives the best representation of the block.

When this is done it is possible to change the position of the origin, while keeping all the other parameters fixed. Note that it is only needed to try new positions along the first direction, since the second direction does not influence the result. However, if errors are compensated for in the second direction 1700 it is required to search in both directions.

It is now time to proceed to step 1604, which is the storing of the parameters. It is possible to store the first and second parameters by just storing $\beta$. The origin can be stored as the value C, where C is calculated so that the origin (ox, oy) lands on the line Ax+By+C=0. The line Ax+By+C should be parallel to the second direction, and its normal (A,B) is therefore parallel with the first direction. Hence A=$-\sin(\beta)$ and B=$\cos(\beta)$ can be used in the line equation. C is obtained from the equation $-\sin(\beta)*\text{ox}+\cos(\beta)*\text{oy}+C=0$. Finally the two colors and the width are stored.

It should be noted that this is just one way of compressing a block. A person skilled in the art will know that it is usually a good idea to use the above solution as the starting point to an optimization. Typically one then tries to change the different parameters and see if the error gets smaller. If it is smaller, this new set of parameters is instead used as the starting point. There are also other ways of arriving at the starting point.

If more than one function is possible, one can try the above method for each of the functions and simply select the function that gives the smallest error. In that case, step 1604 will include storing information on which function was selected. If it is too costly to try all functions, it may be possible to guess which function will fit best, by using a heuristic method.

When compressing a block according to an embodiment of the present invention as illustrated in the flowchart of FIG. 17, the scalar valued function to be used may be selected by trying one or more scalar valued functions 1603*a* as described above and selecting 1603*b* the function which provides the best result, i.e. smallest error. According to one example a block is compressed using five different functions, first with asymmetric-symmetric-single, then asymmetric-asymmetric-single, then with asymmetric double, with asymmetric double-hook and finally with the bilinear patch. The block will then be decompressed again, and the error against the original block is measured. The function that resulted in the smallest error is then used for the final compression. The compression information stored in the block then consists of:
1. Information about which scalar valued function that is used (e.g. asymmetric-symmetric single, vs asymmetric single vs double vs hooked vs bilinear patch), which may be a number between 0 and 4, depending on available number of bits. Hence, the number of functions that can be used for the compression depends on the available number of bits.
2. The parameters for the coordinate system A, B and C. In one embodiment A and B will not be stored directly. Instead an angle v will be stored and A and B will be calculated as A=$-\sin(v)$ and B=$\cos(v)$. It is also possible to use other functions than cos( ) and sin( ) that may be simpler to compute in the decoder.
3. The parameters for the function, such as width (or width_pos and width_neg in the case of asymmetric double and hook).
4. The grayscales or colors such as col0=(red0, green0, blue0) and col1=(red1, green1, blue1), and a third color for double and hook.

According to embodiments of the present invention it is possible to compensate 1700 for errors in the second direction, since the above described embodiments mainly allow the color (or pixel intensity in the case of gray scale) to change when moving in the first direction in FIG. 6. When moving along the second direction, intensities or colors should be substantially constant. While this is a reasonable assumption for many real-world edge blocks, it is still an approximation that may not be correct in all scenarios. Unfortunately, small changes in the second direction can be clearly visible if they are removed and removal of such small changes may result in the form of block artifacts. To avoid these artifacts, it may be necessary allow the intensity (or color) to vary slightly even along the second direction.

This can be done by adding a component to the final gray scale that depends on how far along the second axis along the second direction the point of interest is. Mathematically, this is equivalent to the distance r between the point and the first axis along the first direction. Since the second axis can be described as $Ax+By+C=0$, which has normal vector $(A, B)$, it can be determined that the orthogonal vector is $(-B, A)$. Hence the distance r can be calculated as $$r=-Bx+Ay+D$$

where D is a constant that places the origin in a suitable location, for instance in the middle of the block. This means that D does not need to be stored in the block, since it can be calculated by $D=Bm_x-Am_y$, where $(m_x, m_y)$ is the middle position in the block. This will give $r=-Bm_x+Am_y+D=0$, which is what we wanted. The value r can then be used to affect the gray-scaled value. For instance the arctan example can be extended to:

$$d=d(p_x,p_y)=Ap_x+Bp_y+C$$

$$r=r(p_x,p_y)=-Bp_x+Ap_y+D$$

$$\text{interpolation\_value}=f(d)=(\arctan(d/\text{width})+\pi/2)/\pi$$

$$\text{gray\_value}=(\text{gray0}*(1-\text{interpolation\_value})+\text{gray1}*\text{interpolation\_value})+r*\text{slope}$$

Here the slope parameter indicates how much the gray value should change along the second direction. A large slope value will give a big change, whereas a slope value of zero will mean that the intensity is constant along the second direction.

For color, it is possible to use $$\text{red\_value}=\text{red0}*(1-\text{interpolation\_value})+\text{red1}*\text{interpolation\_value}+r*\text{slope}$$

$$\text{green\_value}=\text{green0}*(1-\text{interpolation\_value})+\text{green1}*\text{interpolation\_value}+r*\text{slope}$$

$$\text{blue\_value}=\text{blue0}*(1-\text{interpolation\_value})+\text{blue1}*\text{interpolation\_value}+r*\text{slope}$$

Here it is possible to let the slope value be different for the different color components, but that also carries a cost since they have to be stored in the compressed block. In practice, using the same slope value in all three color components works well, since the human visual system is most sensitive to block artifacts in the intensity domain, and not so sensitive to block artifacts that appear only in the chrominance.

It is also possible to let the r*slope value have an effect on the interpolation value rather than the final gray level. However, for the asymmetric_double and asymmetric_hook this means that the interpolation value never reaches zero. Since different colors are used on different sides of d=0, there will be a discontinuity along the line $Ax+By+C=0$. This can produce artifacts that are unpleasant. Furthermore, since most lightmaps are smooth, it makes sense to approximate the lightmaps with continuous functions.

An example of how decompression of a block can be carried out. We will start with 64 bits of compressed data: fn=01b, v=0011100b, C=111111.001111b, col0=111111b, 110001b, 000101b, col1=000101b, 101000b, 000111b, width=00110101b.

The first two bits fn states that function number 1 should be used, which may be the arctan function. The second seven bits describes the vector v as a number between 0 and 127 where 0 represents v=0 and 128 represents v=π/2. The value 0011100b=28d is thus equal to 28π/256=0.3436. A thus equals $-\sin(0.3436)=-0.3369$ and B thus equals $\cos(0.3436)=0.9415$. C is a 12-bit two-complement fixed point number, hence between $-2048/64=-32.0$ and $2047/64=31.9844$. In this case there is a negative number 111111.001111b=−000000.110001b=−49/64=−0.7656.

Thus the line equation is now complete; $Ax+By+C=0$ equals $-0.3369x+0.9415y-0.7656=0$.

The width is interpreted as an index to a table of size 256: 00110101b=53 and the value at position 53 is hence taken from the table. In this example the table contains the value 0.325 in position 53, and this is therefore the value of width.

It should be noted that it is not necessary to have stored the width with the help of a table; it is also possible to store the width directly in the block, or a combination (table entry plus offset).

Finally, the colors are decoded from 6 bits per component to 8 bits per components by copying the two most significant bits in each component and putting them as the two least significant bit:

Col0_red=111111b->11111111b=255,

Col0_green=110001b->11000111b=199,

Col0_blue=000101b->00010100b=20.

In the same way,

Col1_red=000101b->00010100b=20,

Col1_green=111111b->11111111b=199,

Col1_blue=000111b->00011100b=28.

It is now possible to calculate the color in the first pixel. If a coordinate system is chosen for the block where the top left corner of the block has coordinates (0,0) and the lower right has coordinates (1,1), a pixel in the position (pos_x, pos_y) will have coordinates $$x=0.125+0.25*\text{pos\_}x,$$

$$y=0.125+0.25*\text{pos\_}y.$$

For instance, the center of pixel (pos_x=0, pos_y=0), i.e., the top left pixel, will have coordinates (0.125+0.25*0, 0.125+0.25*0)=(0.125, 0.125). It is now possible to calculate the red component for that pixel. This can be done by finding the distance d to the pixel center:

$$d=Ax+By+C=-0.3369*0.125+0.9415*0.125-0.7656=-0.69$$

In the next step the interpolation value is calculated by using the arctan formula with the correct width:

$$\text{Interpolation\_value}=((\arctan((-0.69)*(1/0.325)))/(\pi))+0.5=0.1401$$

Finally this interpolation value is used to calculate the color:

$$\begin{aligned}\text{red\_value} &= \text{red0}*(1-\text{interpolation\_value})+\\&\quad \text{red1}*\text{interpolation\_value}=\\&=255*(1-0.1401)+20*(0.1401)\\&=222.07\end{aligned}$$

$$\begin{aligned}\text{green\_value} &= \text{green0}*(1-\text{interpolation\_value})+\\&\quad \text{green1}*\text{interpolation\_value}=\\&=199*(1-0.1401)+255*(0.1401)\\&=206.84\end{aligned}$$

-continued $$\begin{aligned}
\text{blue\_value} &= \text{blue0} * (1 - \text{interpolation\_value}) + \\
&\quad \text{blue1} * \text{interpolation\_value} = \\
&= 20 * (1 - 0.1401) + 28 * (0.1401) \\
&= 21.1208.
\end{aligned}$$

These values are typically rounded to integers, so the final color in the top left pixel is (222, 207, 21). It is possible do the same procedure for all the pixels in the block, and then the following is obtained:

The red component:

| | | | |
|---|---|---|---|
| 222 | 225 | 228 | 230 |
| 209 | 214 | 219 | 223 |
| 182 | 194 | 203 | 210 |
| 134 | 153 | 170 | 185 |

The green component

| | | | |
|---|---|---|---|
| 207 | 206 | 205 | 205 |
| 210 | 209 | 208 | 207 |
| 216 | 214 | 211 | 210 |
| 228 | 223 | 219 | 216 |

The blue component:

| | | | |
|---|---|---|---|
| 21 | 21 | 21 | 21 |
| 22 | 21 | 21 | 21 |
| 22 | 22 | 22 | 22 |
| 24 | 23 | 23 | 22 |

In the above example the intensity correction along the second direction is not used.

The embodiments of the present invention are operable on separate independent 4×4 blocks. Sometimes two adjacent blocks needs to represent a color transition across the borderline between these two blocks, at the same time as the blocks may be difficult to code. If this happens there is an obvious risk that there will be a "jump" in this borderline transition, i.e. a visual "edge artifact".

One way to mitigate this to some extent is to increase "the importance" of the corner and edge pixels according to one embodiment. This is achieved in the block error calculation routine by weighting the corner and edge pixels higher than the "inner" pixels. Typically all pixels in the 4×4 block contribute equally to the error (they have the same the same weight, 1.0). But, by multiplying the error for each of the four corner pixels by 1.375, their contribution is increased by a factor of 1.375, i.e. increased importance. Similarly, the edge pixels are multiplied by a factor of 1.1875 whereas the four "inner pixels" are multiplied by a factor of 0.25, i.e. their importance has decreased to only a fourth. Note that these weight numbers are just examples.

By having this alternative way of calculating the block error during compression, the functions and their associated parameters are chosen so that the edge and corner pixels are reconstructed with better accuracy/fidelity and hence the "edge artifacts" are less visible.

Moreover, the embodiments of the present invention also concern a method for the decoder of a GPU as illustrated in the flowchart of FIG. 18. In the method, the compressed block represented by a set of compressed data is received 1801 in an input of the decoder. Further, indications identifying a scalar-valued function for the compressed block and representations of the first and second values (e.g. color values) and, the parameters for the scalar valued function and representations for a first direction, a second direction and an origin from which the first and second directions originate, are also received 1802, 1803, 1804.

In step 1805 the scalar-valued function is used in conjunction with the received representations of the first and second values and the parameters for the scalar valued function for de-compressing the block.

Figure 1:
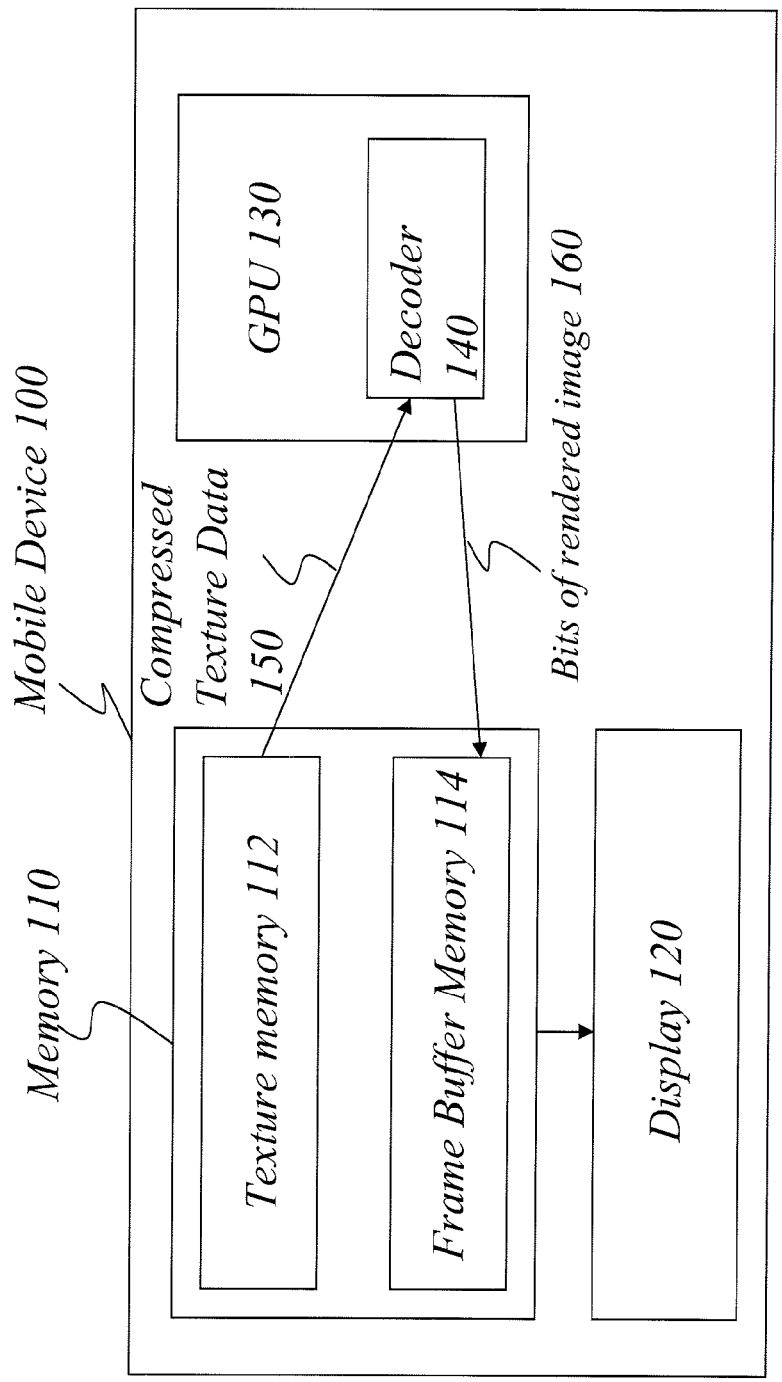
FIG. 1 schematically illustrates a mobile device with a GPU according to prior art.
Figure 2B:
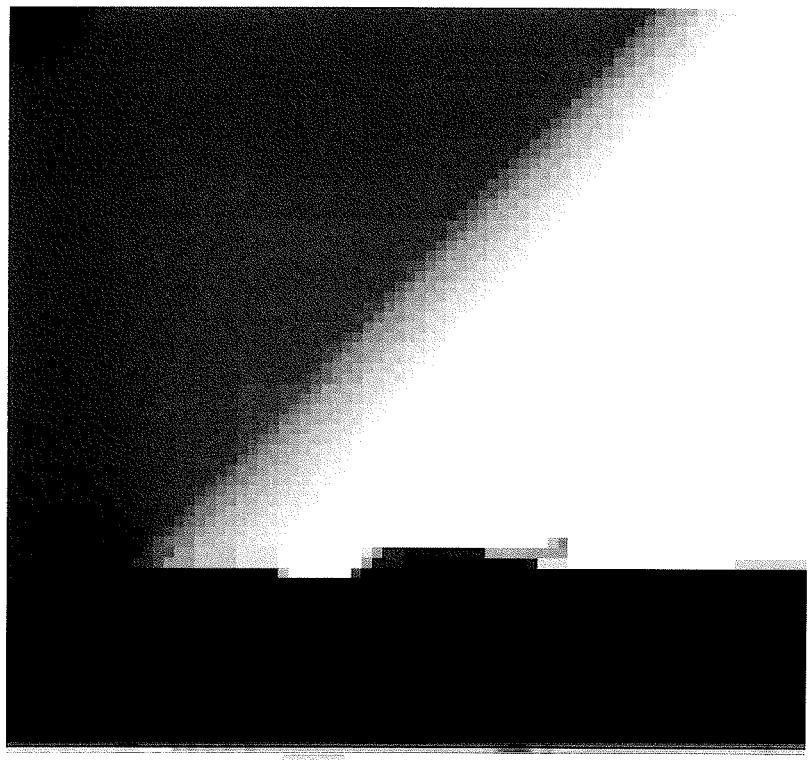
FIG. 2a shows the original texture and FIG. 2b shows the texture compressed with DXT1.
Figure 2A:
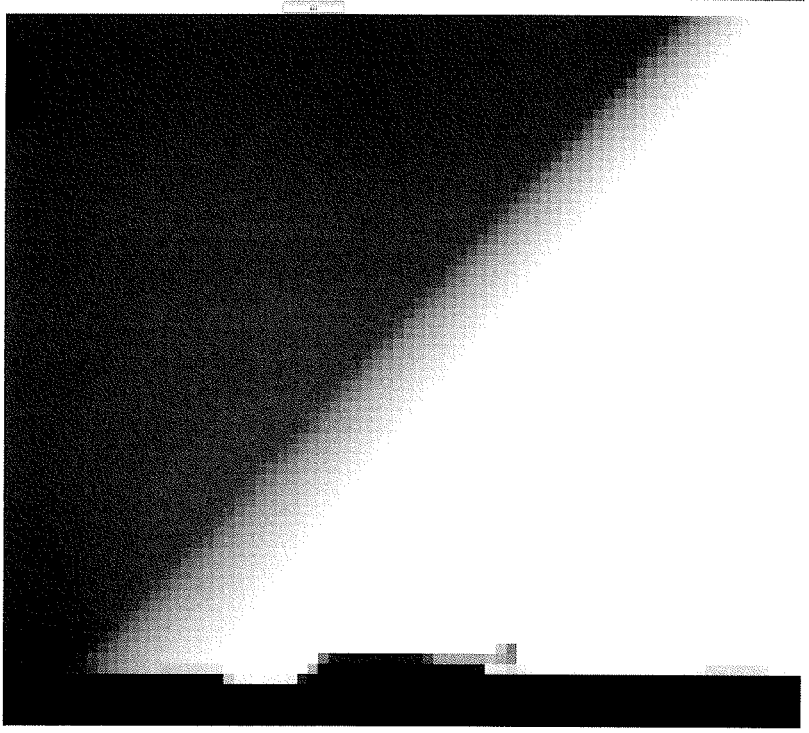
Figure 3:
FIG. 3 shows a texture compressed with ETC2.

The above mentioned methods may be implemented in an encoder and decoder as illustrated in FIG. 14. FIG. 14 illustrates schematically a mobile device 1460 with a GPU 1470 and an external computer 1400 with an encoder 1500 and a memory 1420 for storing textures. As explained in conjunction with FIG. 1, compressed images called textures received from the encoder 1500 are stored in an image memory 1442 and bits of theses compressed images 1490 are transmitted over from the texture memory 1442 to the GPU 1470 and then decoded by a decoder 1480 of the GPU 1470. The GPU 1470 then uses the bits of decompressed textures to produce bits of a rendered image 1495. These bits of the rendered image are then sent back to a frame buffer memory 1444 and then displayed at the display 1450. If the texture 1410 is an image of Mona Lisa, the compressed texture 1430 is then the image of Mona Lisa compressed using an embodiment of the present invention. The bits of the compressed texture 1490 are a block of the compressed Mona Lisa image, for instance depicting her mouth. Further, bits of the rendered image 1495 may be a mouth-part of the rendered image, perhaps seen at an angle. The frame buffer memory 1444 stores the final image of the Mona Lisa room in le Louvre, where Mona Lisa is seen at an angle.

It should be noted that the encoder performing the compression may be located in an external computer to the device wherein the compressed image is stored (e.g. in the mobile device) or the compression may be performed by a CPU or a GPU of a device wherein the compressed image is stored, e.g. in the mobile device.

Accordingly, the encoder 1500 for compressing the block comprises as illustrated in FIG. 15 a dividing unit 1530 for dividing 1600 the image into a plurality of blocks, wherein each block comprises a number of pixels and each pixel has a value here exemplified by a color value. Further, the encoder comprises further a processor 1520 configured to determine a first color and a second color. The processor is also configured to establish a first direction, a second direction and an origin from which the first and second directions originate in the block to be compressed. The first direction is orthogonal to the second direction, and the value of the color varies from a value of the first determined color to a value of the second determined color when moving along the first direction. Further, the processor is configured to determine parameters to a scalar valued function for interpolating between the value of the first color and second color. A memory 1540 is also provided for storing representations of the first and second colors and the parameters for the scalar valued function. The block is compressed by a compression unit 1510 by representing the color values of the pixels of the block with the stored representations of the first and second colors and the parameters for the scalar valued function.

According to embodiments of the invention, the processor 1520 is further configured to evaluate a number of scalar-valued functions such as an arctan-function, a symmetric single asymmetric function, a asymmetric_double_hook and a bilinear patch, and to select one of the evaluated scalar-valued functions which fulfils a predetermined condition.

The processor 1520 is further configured to compensate for an error in a pixel along the second direction by adding a component to the final color value, wherein the error is dependent on how far along the second axis the pixel is.

Turning again to FIG. 15, a decoder according to embodiments of the present invention is illustrated. The decoder 1550 comprises an input 1560 configured to receive the compressed block represented by a set of compressed data, indications identifying a scalar-valued function for the compressed block, and representations of the first and second values, here exemplified by color values, and the parameters for the scalar valued function. The decoder further comprises a de-compression unit 1570 configured to use the scalar-valued function in conjunction with the received representations of the first and second colors and the parameters for the scalar valued function for de-compressing the block, wherein the scalar-valued function substantially represents a value associated with the color of the pixels of the block.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for compressing at least one block of an image, comprising:
    dividing the image into a plurality of blocks, wherein each block comprises a number of image elements and each image element has a value,
    establishing a first direction, a second direction and an origin from which the first and second directions originate in the block to be compressed, wherein the first direction is orthogonal to the second direction, and the value varies from a first determined value to a second determined value when moving along the first direction,
    determining a first value and a second value,
    determining parameters to a scalar valued function for interpolating between the first and second value, and
    storing representations of the first and second values, the parameters for the scalar valued function and representations for the first direction, the second direction and the origin.

2. The method according to claim 1, wherein the scalar valued function is one of an arctan-function, a symmetric single asymmetric function, a asymmetric_double_hook and a bilinear patch.

3. The method according to claim 1, further comprising:
    evaluating a number of scalar valued functions, and
    selecting one of the evaluated scalar valued functions which fulfills a predetermined condition.

4. The method according to claim 3, wherein the number of scalar valued functions comprises at least one of an arctan-function, a symmetric single asymmetric function, a asymmetric_double_hook and a bilinear patch.

5. The method according to claim 1, wherein the image is a gray scale image and the values are gray scale images.

6. The method according to claim 1, wherein the image is a color image, wherein the values are colors represented by a trituple of RGB components.

7. The method according to claim 1, further comprising:
    compensating for an error in one of the image elements along the second direction by adding a component to the final value, wherein the error is dependent on how far along the second axis the image element is.

8. A method in a decoder of a processing unit for decompressing a block of a compressed image which is divided into a plurality of blocks, wherein each block comprises a number of image elements and each image element has a value, the method comprising:
    receiving the compressed block represented by a set of compressed data,
    receiving representations for a first direction, a second direction and an origin from which the first and second directions originate, wherein the first direction is orthogonal to the second direction, and the value varies from a first determined value to a second determined value when moving along the first direction,
    receiving representations of the first and second values and the parameters for the scalar valued function,
    receiving indications identifying a scalar valued function for the compressed block, and
    using the scalar valued function in conjunction with the received representations of the first and second values and the parameters for the scalar valued function and the first and second directions and the origin for de-compressing the block, wherein the scalar valued function substantially represents a value of the image elements of the block.

9. The method according to claim 8, wherein the scalar valued function is one of an arctan-function, a symmetric single asymmetric function, a asymmetric_double_hook and a bilinear patch.

10. The method according to claim 8, wherein the image is a gray scale image and the values are gray scale images.

11. The method according to claim 8, wherein the image is a color image, wherein the values are colors represented by a trituple of RGB components.

12. An encoder for compressing at least one block of an image, comprising a dividing unit for dividing the image into a plurality of blocks, wherein each block comprises a number of image elements and each image element has a value, the encoder further comprises a processor configured to determine a first value and a second value, the processor configured to establish a first direction, a second direction and an origin from which the first and second directions originate in the block to be compressed, wherein the first direction is orthogonal to the second direction, and the value varies from a first determined value to a second determined value when moving along the first direction, the processor also configured to determine parameters to a scalar valued function for interpolating between the value of the first value and the second value, the encoder further comprising a memory for storing representations of the first and second values and the parameters for the scalar valued function and representations for the first direction, the second direction and the origin.

13. The encoder according to claim 12, wherein the scalar valued function is one of an arctan-function, a symmetric single asymmetric function, a asymmetric_double_hook and a bilinear patch.

14. The encoder according to claim 12, wherein the processor is further configured to evaluate a number of scalar valued functions, and to select one of the evaluated scalar valued functions which fulfills a predetermined condition.

15. The encoder according to claim 14, wherein the number of scalar valued functions comprises at least one of an arctan-function, a symmetric single asymmetric function, a asymmetric_double_hook and a bilinear patch.

16. The encoder according to claim 12, wherein the image is a gray scale image and the values are gray scale values.

17. The encoder according to claim 12, wherein the image is a color image, and the values are represented by a trituple of RGB components.

18. The encoder according to claim 12, wherein the processor is further configured to compensate for an error in one of the image elements along the second direction by adding a component to the final value, wherein the error is dependent on how far along the second axis the image element is.

19. A decoder in a processing unit for decompressing a block of a compressed image which is divided into a plurality of blocks, wherein each block comprises a number of image elements and each image element has a value, the decoder comprises an input configured to receive the compressed block represented by a set of compressed data, indications identifying a scalar valued function for the compressed block, and representations of first and second values and parameters for the scalar valued function and representations for a first direction, a second direction and an origin from which the first and second directions originate, wherein the first direction is orthogonal to the second direction, and the value varies from a first determined value to a second determined value when moving along the first direction, and a de-compression unit configured to use the scalar valued function in conjunction with the received representations of the first and second values and the parameters for the scalar valued function and the first and second directions and the origin for de-compressing the block, wherein the scalar valued function substantially represents a value associated with the value of the image elements of the block.

20. The decoder according to claim 19, wherein the scalar valued function is one of an arctan-function, a symmetric single asymmetric function, a asymmetric_double_hook and a bilinear patch.

21. The decoder according to claim 19, wherein the image is a gray scale image and the values are gray scale values.

22. The decoder according to claim 19, wherein the image is a color image, and the values are represented by a trituple of RGB components.

* * * * *